(12) United States Patent
Janocko et al.

(10) Patent No.: US 8,690,534 B1
(45) Date of Patent: Apr. 8, 2014

(54) BACKUP SEALS IN ROTARY PUMPS

(75) Inventors: David Jeffrey Janocko, Pittsburgh, PA (US); Charles David Bice, Saxonburg, PA (US)

(73) Assignee: Curtiss-Wright Electro-Mechanical Corporation, Cheswick, PA (US)

( * ) Notice: Subject to any disclaimer, the term of this patent is extended or adjusted under 35 U.S.C. 154(b) by 1042 days.

(21) Appl. No.: 12/480,554

(22) Filed: Jun. 8, 2009

(51) Int. Cl.
*F16J 15/00* (2006.01)
*F04D 29/10* (2006.01)

(52) U.S. Cl.
USPC ............................. 415/231; 277/508; 277/589

(58) Field of Classification Search
USPC .......... 415/231, 230; 277/508, 589, 531, 532, 277/467, 470, 496–499
See application file for complete search history.

(56) References Cited

U.S. PATENT DOCUMENTS

| | | | |
|---|---|---|---|
| 2,807,483 A | 1/1956 | Cornelius | |
| 3,574,473 A | 4/1971 | Gaffel | |
| 3,582,093 A * | 6/1971 | Lucien | 277/434 |
| 4,105,040 A * | 8/1978 | Chester | 137/72 |
| 4,296,934 A | 10/1981 | Atkin | |
| 4,302,020 A * | 11/1981 | Morales | 277/530 |
| 4,468,041 A * | 8/1984 | Yoshimura et al. | 277/584 |
| 4,618,154 A | 10/1986 | Freudenthal | |
| 5,118,119 A | 6/1992 | Ditlinger | |
| 5,171,024 A * | 12/1992 | Janocko | 277/644 |
| 5,368,312 A | 11/1994 | Voit et al. | |
| 5,562,294 A | 10/1996 | Marsi | |
| 5,799,953 A | 9/1998 | Henderson | |
| 5,988,649 A | 11/1999 | VanRyper et al. | |
| 6,173,968 B1 * | 1/2001 | Nelson et al. | 277/619 |
| 6,254,103 B1 * | 7/2001 | Cooke | 277/435 |
| 6,358,000 B1 | 3/2002 | Veronesi et al. | |
| 6,547,250 B1 * | 4/2003 | Noble et al. | 277/309 |
| 6,918,595 B2 | 7/2005 | Proper | |
| 7,341,258 B2 | 3/2008 | Holt et al. | |
| 8,356,972 B2 | 1/2013 | Howard et al. | |
| 2006/0022414 A1 | 2/2006 | Balsells | |
| 2007/0164517 A1 * | 7/2007 | Caprera | 277/500 |
| 2007/0172367 A1 * | 7/2007 | Janocko | 417/423.11 |

OTHER PUBLICATIONS

"Shield Passive Thermal Shutdown Seal for Reactor Coolant Pumps", Advertisement, 2009, Cranberry Township, Pennsylvania, www.westinghousenuclear.com.

* cited by examiner

*Primary Examiner* — Nathaniel Wiehe
*Assistant Examiner* — Su Htay
(74) *Attorney, Agent, or Firm* — Reed Smith LLP

(57) ABSTRACT

Arrangements for promoting the restriction of fluid flow along a shaft via providing a deformable ring member in an annulus between the shaft and housing. In an initial general condition, the deformable ring member permits free fluid flow in a general direction along the shaft while in a second, constricted condition, the deformable ring closes or blocks a gap or clearance normally conducive to free fluid flow to thereby restrict fluid flow. An actuation medium, which can take any of a very wide variety of forms, preferably promotes constriction of the deformable ring member directly or indirectly.

15 Claims, 30 Drawing Sheets

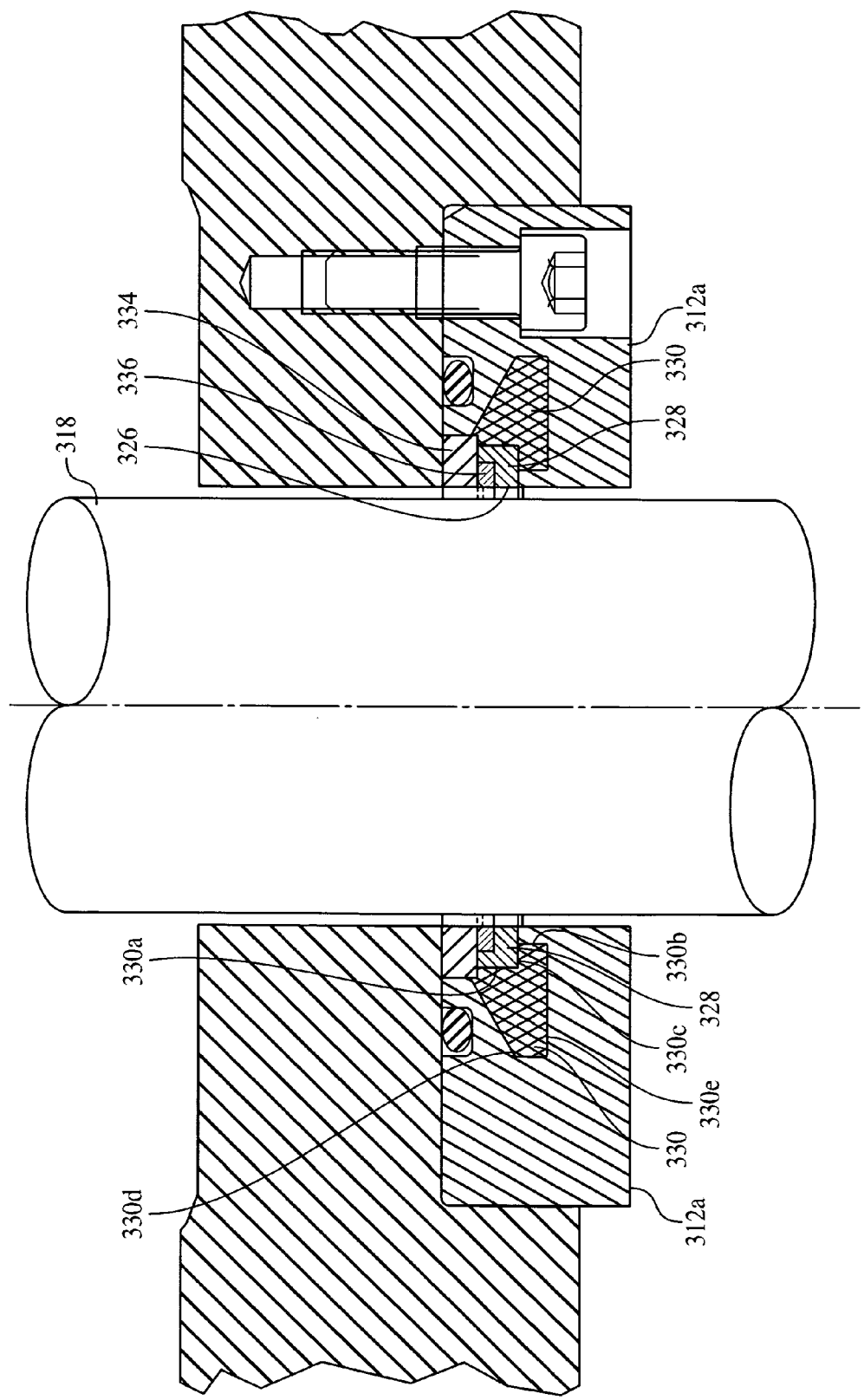

BACKUP SEALS IN ROTARY PUMPS

FIELD OF THE INVENTION

The invention generally relates to rotary pumps, such as chemical processing pumps or nuclear reactor coolant pumps, and constituent components therefor, such as flow restricting devices and mechanical shaft seal systems.

BACKGROUND OF THE INVENTION

In pressurized water nuclear power plants, a reactor coolant system is used to transport heat from the reactor core to steam generators for the production of steam. The steam is then used to drive a turbine generator. The reactor coolant system includes a plurality of separate cooling loops, each connected to the reactor core and containing a steam generator and a rotary coolant pump. Other venues also present situations where containment of a process fluid is critical, such as in the case of rotary chemical processing pumps or other equipment where leakage around a shaft is critical, such as a backup seal to packing in a valve.

A rotary pump such as a reactor coolant pump or chemical processing pump typically is a centrifugal pump designed to move large volumes of process fluid (e.g., reactor coolant) at a wide range of temperatures and pressures (including very high temperatures and pressures). Such a pump normally includes hydraulic, shaft seal and motor sections. A hydraulic section usually includes an impeller mounted at an end of a pump shaft which is operable within the pump casing to pump process fluid. A motor section includes a motor which is coupled to drive the pump shaft. A middle shaft seal section usually includes tandem sealing assemblies located concentric to, and near the top (motor end) end of, the pump shaft. Such sealing assemblies normally are configured for allowing but minimal process fluid leakage along the pump shaft during normal operating condition. Representative examples of known pump shaft sealing assemblies, at least in the context of reactor coolant pumps, may be found in the following U.S. Pat. Nos.: MacCrum (No. 3,522,948), Singleton (No. 3,529,838), Villasor (No. 3,632,117), Andrews et al (No. 3,720,222) and Boes (No. 4,275,891).

Pump shaft sealing assemblies, as such, must normally be capable of containing fluids at a high system pressure without excessive leakage. Tandem arrangements of sealing assemblies or mechanical seals, for instance, serve to break down the pressure in stages. Pump sealing assemblies in fact may act as controlled-leakage seals which, in operation, allow a minimal amount of controlled leakage at each stage while preventing excessive leakage of process fluid (e.g., reactor coolant) from the primary fluid system to respective seal leakoff ports. This applies in many scenarios where containment of excess leakage is critical. In the case of nuclear reactor coolant pumps, since pump sealing assemblies can be prone to failure, e.g. in response to unmitigated high temperatures of reactor coolant, any resultant excessive leakage rates could lead to reactor coolant uncovering of a reactor core, and subsequent core damage. (To be more precise, at least in nuclear reactor cooler pumps, seal packages tend to be isolated from the high temperature fluid in the vicinity of the impeller and other hydraulic components via the injection of a cool buffer fluid just upstream of the seal package, and/or by an auxiliary cooling system heat exchanger which cools the hot water flowing from the hot impeller/hydraulic part of the pump. The latter auxiliary cooling system can come into play if the aforementioned cool buffer fluid supply is lost. If both the buffer fluid supply and the cooling water supply to the auxiliary cooling system are lost the seal package can be challenged by exposure to high temperature water.)

While U.S. Pat. No. 5,171,024 (Janocko) discloses a shutdown seal arrangement for preventing and arresting excess fluid leakage along a pump shaft, needs continually are being recognized in connection with providing an even more effective arrangement, whether in the context of nuclear reactor coolant pumps or other contexts such as chemical processing pumps.

SUMMARY OF THE INVENTION

There are broadly contemplated herein, in accordance with at least one embodiment of the invention, arrangements for effecting the restriction of fluid flow along a shaft via providing a deformable ring member in an annulus between the shaft and housing. In an initial general condition, the deformable ring member permits free fluid flow in a general direction along the shaft (preferably while not contacting or interfering with shaft motion) while in a second, constricted condition, the deformable ring closes or blocks a gap or clearance normally conducive to free fluid flow to thereby restrict fluid flow. An actuation medium, which can take any of a very wide variety of forms, preferably promotes constriction of the deformable ring member directly or indirectly.

At least one embodiment of the invention is a rotary pump having a motor, a shaft member extending from the motor, an impeller attached to a free end of the shaft member, a housing which encloses a major portion of the shaft member, the housing comprising a seal housing which circumscribes at least a portion of the shaft member, the seal housing including at least one sealing element for restricting and controlling fluid flow along the shaft member during normal operation, the motor being configured for rotating the shaft in a manner to drive the impeller, and an auxiliary arrangement for restricting fluid flow along the shaft relative to the seal housing in at least one annular space defined between the shaft member and the seal housing.

The pump's auxiliary fluid flow restricting arrangement includes a deformable ring member in an annulus between the shaft and housing. In an initial general condition, the deformable ring member permits free fluid flow in a general direction along the shaft (preferably while not contacting or interfering with shaft motion) while in a second, constricted condition, the deformable ring closes or blocks a gap or clearance normally conducive to free fluid flow to thereby restrict fluid flow. An actuation medium, which can take any of a very wide variety of forms, preferably promotes constriction of the deformable ring member directly or indirectly The novel features which are considered characteristic of the invention are set forth herebelow. The invention itself, however, both as to its construction and its method of operation, together with additional objects and advantages thereof, will be best understood from the following description of the specific embodiments when read and understood in connection with the accompanying drawings.

BRIEF DESCRIPTION OF THE DRAWINGS

The invention and embodiments thereof will be better understood by way of reference to the detailed disclosure herebelow and to the accompanying drawings, wherein:

FIG. 3A illustrates schematically a cross-sectional, elevational view of a first deformable ring arrangement about a shaft, in an initial general condition.

DETAILED DESCRIPTION OF THE EMBODIMENTS

Figure 1:
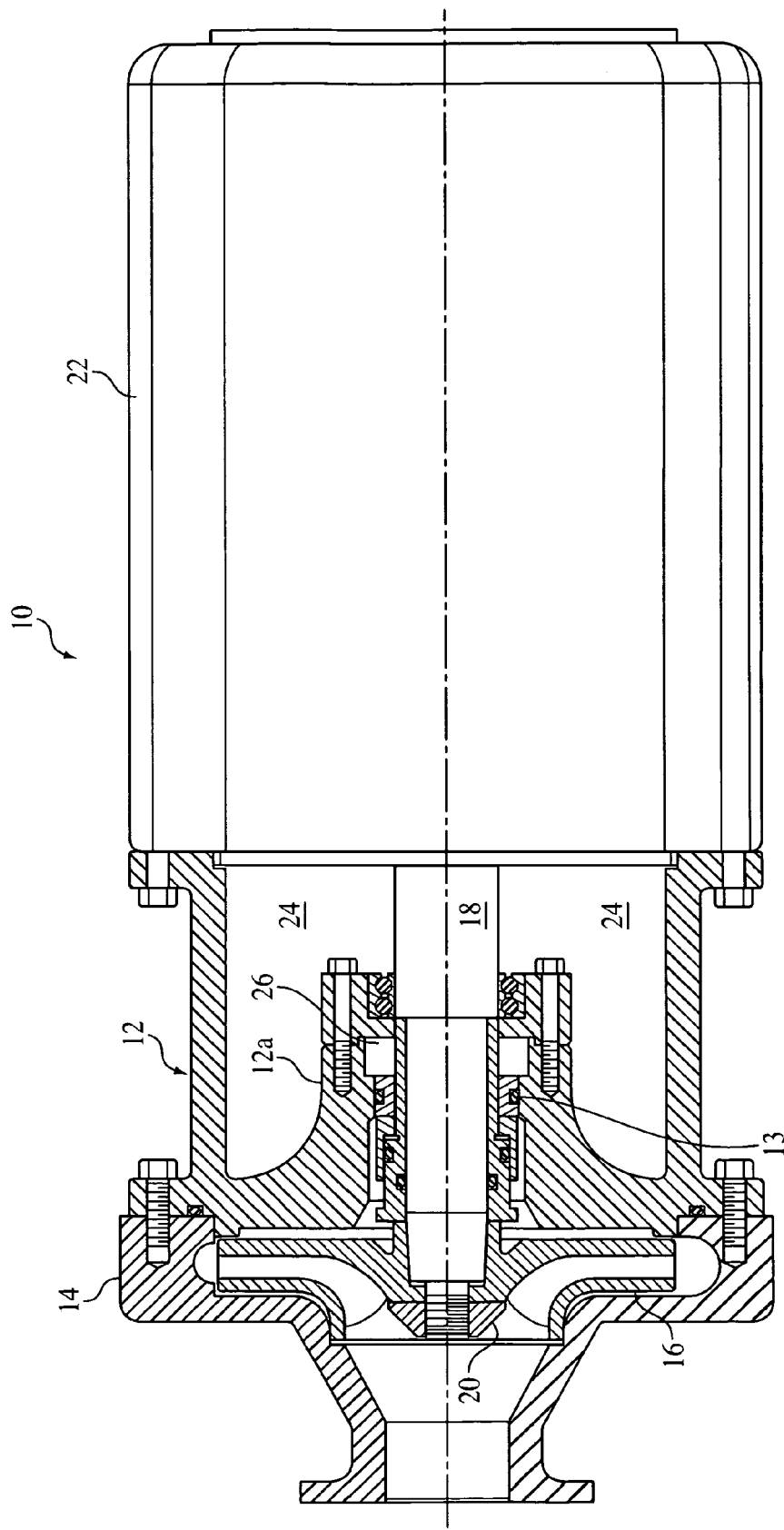
FIG. 1 illustrates, in a partial cross sectional view, a centrifugal pump employing a constricting ring arrangement.

Referring to FIG. 1, a pump 10 generally includes a main pump housing 12. While, in the embodiment shown, housing 12 forms a large portion of an external housing for pump 10, it retracts inwardly to further form an internal seal housing 12a. An impeller housing 14 is also bolted to the main pump housing 12 and houses an impeller 16. Pump 10 can be representative of a wide variety of rotary pumps, including general centrifugal pumps, nuclear reactor coolant pumps and chemical processing pumps (e.g., as commonly used in the chemical processing industry). Pump 10 may be oriented in any direction appropriate for the application at hand, e.g., a generally horizontal direction or (in the case of a reactor coolant pump) in a generally vertical direction. Thus, while FIG. 1 is reminiscent of a generic small horizontal process pump, it should be understood that components shown therein and general concepts relating to the pump and components shown can easily and broadly be applicable to a very wide variety of other pumps (such as vertical nuclear reactor coolant pumps).

The pump 10 includes a pump shaft 18 extending centrally with respect to the pump housing 12 and being sealingly and rotatably mounted within the seal housing 12a. Pump shaft 18, at one end thereof, is connected to impeller 16 (e.g., via a cap 20 as shown), while, at another end, is connected to an electric motor 22. When the motor 22 rotates the shaft 18, the impeller 16 causes pressurized reactor coolant to flow through the general reactor coolant system. At the same time, this pressurized coolant applies an upwardly directed, hydrostatic load upon the shaft 18.

In order that the pump shaft 18 might rotate freely within the seal housing 12a while maintaining a high pressure boundary between the pump high pressure region (i.e., the chambers associated with impeller 16 and extending to the right therefrom with respect to FIG. 1) and a region (indicated at 24) ambient to the seal housing 12a, sealing assemblies are preferably provided, including a mechanical face seal 13. The general layout and function of conventional sealing assemblies can be more fully understood from Janocko, supra.

In accordance with at least one embodiment of the invention, there is broadly contemplated a backup seal including a deformable ring member that can be located generally at annular region indicated at 26, for limiting fluid flow between shaft 18 and housing 12a under given conditions, as will be better appreciated in the discussion herebelow. As will also be better appreciated herebelow, supplementary components, at annular region 26 and/or elsewhere, may be provided to assist in actuating the deformable ring member between an initial general condition and a second, constricted general condition. The deformable ring member in this as well as other disclosed embodiments is not intended to support the rotation of shaft 18 while providing its sealing function. The rotation of shaft 18 is stopped before the deformable ring member is actuated to provide sealing.

Figure 2A:
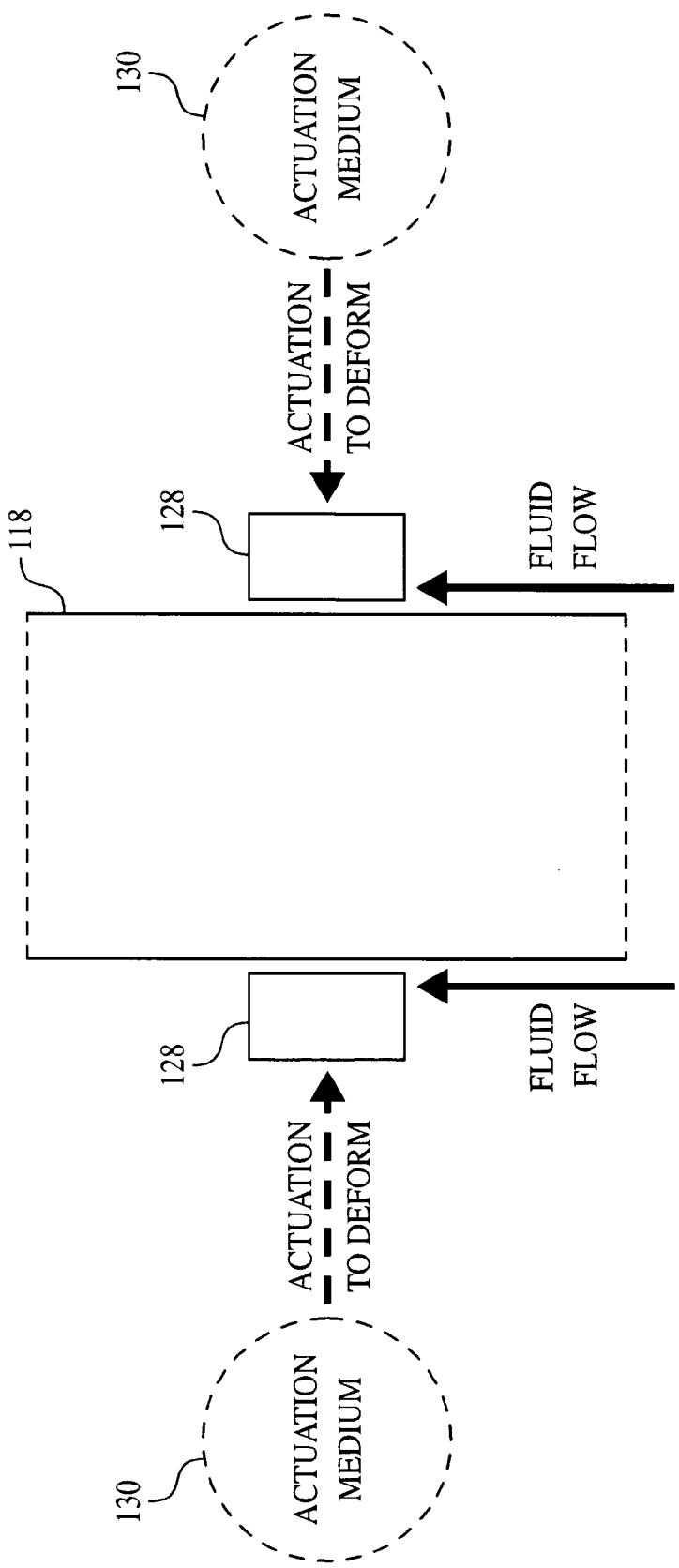
FIG. 2A schematically illustrates a shaft 118 and deformable ring member in an initial general condition.
Figure 2B:
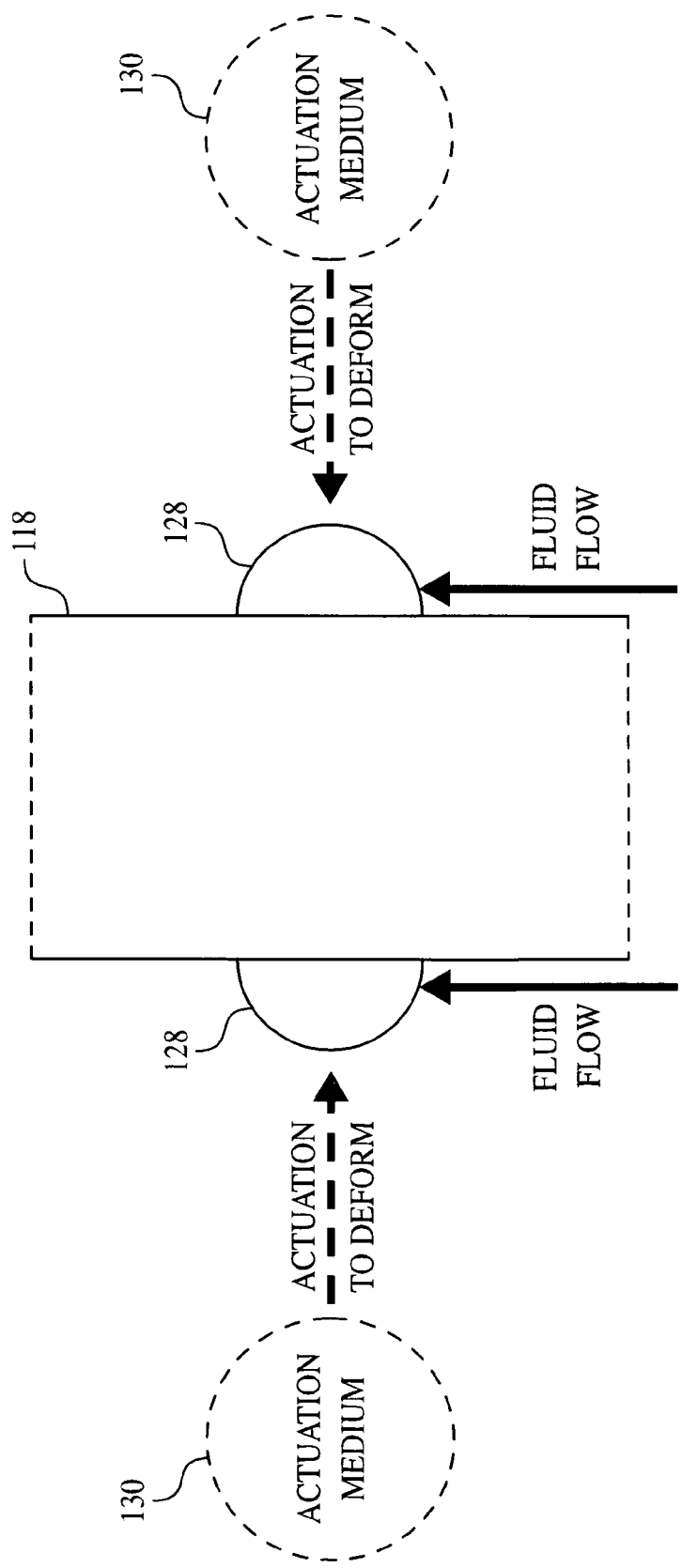
FIG. 2B schematically illustrates essentially the same view as FIG. 2A, but showing the deformable ring member actuated into a second, constricted general condition.

FIGS. 2A and 2B broadly and schematically illustrate general principles that undergird the configuration and functioning of embodiments of the invention as set forth herethroughout.

FIG. 2A schematically illustrates, in accordance with at least one embodiment of the invention, a shaft 118 and deformable ring member 128 in an initial general condition. Preferably, a deformable ring member 128 may be located in an annular or other generally circumferential chamber which circumscribes the shaft 118, which chamber could, e.g., be located in a region such as that indicated at 26 in FIG. 1. Preferably, ring member 128 will be positioned such that it can act to restrict the flow of fluid that progresses in a direction, shown by the solid arrows, that is generally parallel to a central longitudinal axis of the shaft 118. It may thus essentially act as a "shutdown seal" or "backup seal" where a precipitating event (such as failure of a main seal, a large scale fluid leak in general, and/or fluid overheating), usually upstream, can prompt the automatic or manual direction of fluid flow restriction at a downstream location such as at region 26 in FIG. 1.

Preferably, in an initial general condition of the deformable ring member 128, a sufficient gap is provided (adjacent shaft 118 and/or elsewhere) to permit a free flow of fluid in the general direction indicated by the solid arrows. Preferably, in accordance with at least one embodiment of the invention, the deformable ring member 128 will be largely or completely undeformed in such a general condition. As will now be better appreciated, an actuation medium 130 can preferably act to deform ring member 128 responsive to a precipitating event as mentioned above.

Thus, FIG. 2B schematically illustrates essentially the same view as FIG. 2A, but showing the deformable ring member 128 actuated into a second, constricted general condition. Here, the actuation medium 130 has acted to constrict or otherwise deform the ring member 128 in a manner to obstruct fluid flow that normally progresses in the general direction of the solid arrows. As shown, the ring member 128 may essentially be constricted or deformed so as to contact the shaft 118 (or associated portion thereof) and thereby restrict fluid flow, and/or can be constricted or deformed so as to block off one or more fluid passages elsewhere to similar effect.

As will be appreciated from further discussion herebelow, deformable ring member 128 and actuation medium 130 can each take on a wide variety of different forms. Actuation medium 130, for its part, could conceivably be embodied, e.g., by a single mechanical constricting arrangement, a separate upstream seal arrangement that promotes a pressure differential sufficient for constricting the ring member 128, or even another medium or mechanism that readily applies a constricting force to the ring member 128 to cause the ring member 128 to constrict and impede fluid flow.

Ring member 128 could conceivably be embodied, e.g., by a single continuous ring. Such a single continuous ring could essentially be monolithic, i.e., without additional components associated therewith, or indeed could have supplementary components associated therewith. Ring 128 could alternatively be embodied, e.g., by a continuous composite ring such as a continuous ring with two continuous parts that cooperate and interact with one another by way of serving to constrict fluid flow. By way of yet another alternative, ring 128 could be embodied, e.g., by a discontinuous ring where an actuation medium in combination therewith results in a continuous tangible circumscription about the shaft 118.

Generally, the layout and configuration of highly stylized components in FIGS. 2A and 2B is no way intended to imply or convey an actual layout or configuration; indeed, the wide range of possible layouts and configurations can readily be appreciated from the discussion of specific exemplary embodiments with relation to FIGS. 3A-9C.

Preferably, a ring member 128 or a major portion thereof may be formed from a material that has a lower modulus of elasticity than surrounding components, such as shaft 118 and housing 12a (see FIG. 1). The ring member 128 being relatively flexible and deformable due to its low material modulus has the ability to deflect and conform advantageously under applied and controlled loadings provided through the actuation medium schematically represented as 130 in FIGS. 2A and 2B. The ring member 128 under such loadings provided by the actuation medium 130 deflects inwardly to constrict toward the shaft, its circumference and diameter decreasing even though the ring member 128 is solid and continuous (i.e. without a split or separation across its circumference). Such a material could be polymeric (polymer or plastic); in particular, a very favorable example of such a material in settings as described herein is PolyEtherEtherKetone (PEEK). In some settings the temperature and pressure dependencies of the physical characteristics of a semi-crystalline polymer, such as PEEK, do offer attractive variations of physical moduli that serve to satisfy initially the contraction to contact with shaft and secondly the required resistance to extrusion once the high-pressure seal is obtained. However, it should not be construed that PEEK is the only material suitable for the devices described herein. Any material with the appropriate characteristics to support the functions of the device in the environment offered by a specific application could be applied.

The disclosure now turns, with reference to FIGS. 3A-9C, to a discussion of various specific embodiments that follow from the general principles set forth in FIGS. 2A and 2B. Numerals referencing like components are advanced by multiples of 100. It of course should readily be understood that the shapes, dimensions and general configurations set forth in FIGS. 3A-9C are provided merely by way of illustrative and non-restrictive examples and in no way are intended to limit the great variety of shapes, dimensions and configurations that are broadly contemplated herein in accordance with embodiments of the invention.

FIG. 3A illustrates schematically a cross-sectional, elevational view of a first deformable ring arrangement about a shaft, in an initial general condition. As shown, an annular chamber 326 may be disposed about shaft 318. Preferably contained therein is a continuous and deformable ring member 328 circumscribing or surrounding the shaft 318, with an actuation element in the form of an expandable ring 330 circumscribing or surrounding, and preferably contacting the outer diameter of, ring member 328.

Ring member 328 preferably functions in a manner as discussed generally hereinabove, that is, it preferably deforms, in a radially inward direction with respect to a central longitudinal axis of shaft 318, in response to actuation in the form of constriction. Here, expandable ring 330 provides such actuation. Preferably, expandable ring 330 is formed from a material with a relatively high coefficient of thermal expansion as manifested in a closed volume; any material selected from a very wide variety of elastomers, including EPDM (ethylene propylene diene M-class) rubber, would work favorably in this regard. Preferably, expandable ring 330 unbrokenly circumscribes ring member 328 so as to be able to provide a radially inwardly compressive or constricting force to the entire outer circumference of ring member 328. In the illustrated embodiment, the expandable ring 330 includes an inner surface having an upper first portion 330a and lower second portion 330b, wherein the second portion 330b has a smaller diameter than the first portion 330a, and wherein the first and second portions 330a, 330b are connected by a radial portion 330c. The first portion 330a and the radial portion 330c form a seat for the ring member 328. The expandable ring 330 further includes upper and lower surfaces 330d, 330e, wherein the upper surface 330d includes a sloped conical surface portion. The annual chamber 326 has a sloped surface corresponding to the sloped conical surface portion.

Figure 3B:
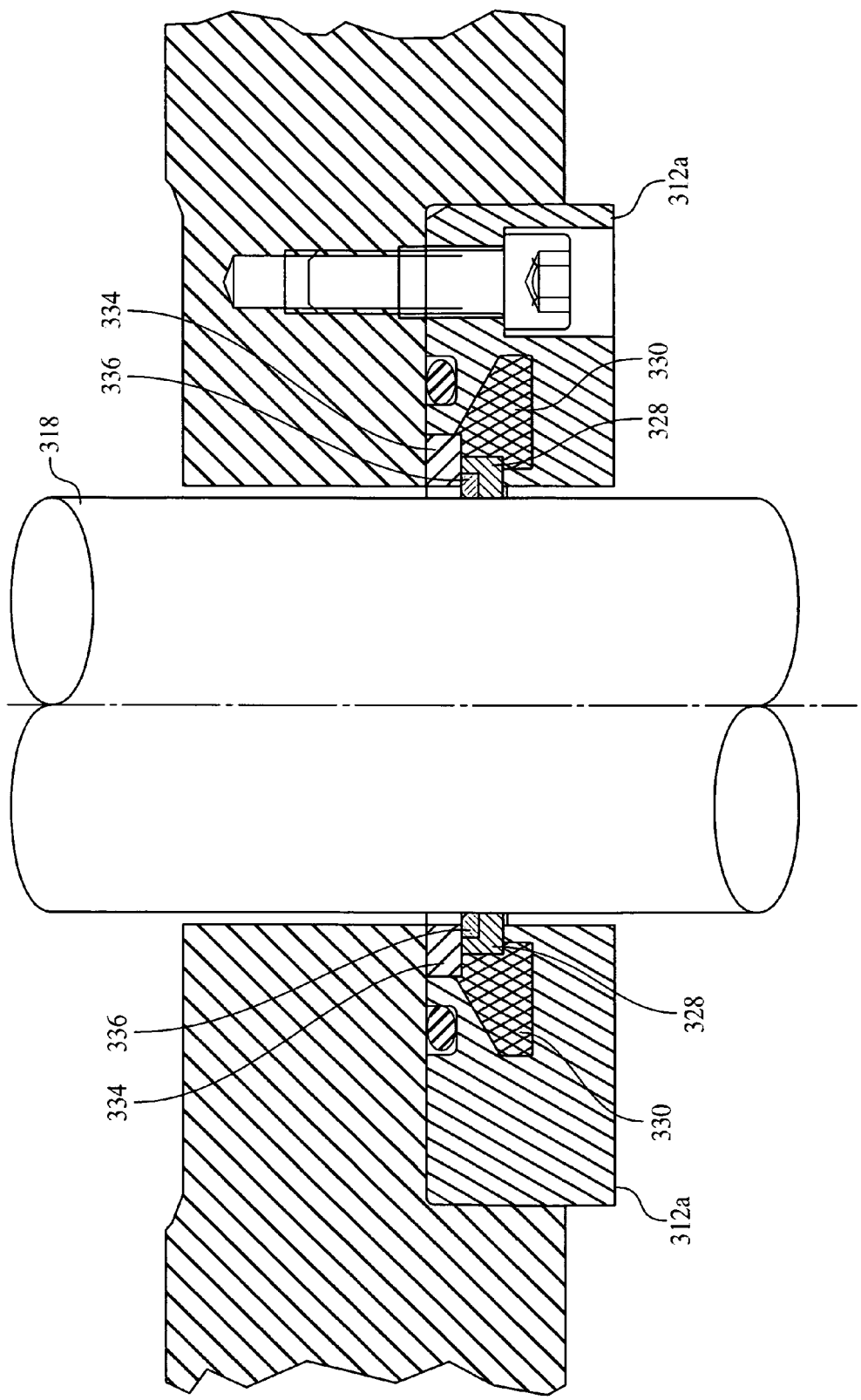
FIG. 3B is essentially the same view as FIG. 3A but showing the deformable ring arrangement actuated into a second, constricted general condition.

Preferably, expandable ring 330 would act in such a way as to expand as a temperature (e.g., fluid temperature) within chamber 326 exceeds a given level. Thus, size constraints of chamber 326 will preferably ensure that such expansion will promote a transition of ring member 328 from the initial condition such as shown in FIG. 3A, where a fluid flow path sufficient for permitting a normal throughput of fluid (in a direction generally parallel to the central longitudinal axis of shaft 318) is present, to a second, constricted condition such as shown in FIG. 3B, where expansion of expandable ring 330 has acted to compress and constrict ring member 328 about shaft 318 and thus throttle or fully block the normal throughput of fluid. The normal flow with respect to FIGS. 3A and 3B being from bottom to top along the shaft 318, the hydrostatic pressure forces exerted by the sealed fluid would tend to act upward on the ring member 328, tending cause the upper face of the ring member 328 to contact against the opposing surface of the annular chamber 326, and in so doing effecting a seal between the ring member 328 and the housing 312a. This contact and seal between the ring member 328 and the housing element 312a along with the contact and seal between the ring member 328 and the shaft 318 will much limit the leakage flow. This application of upward axial hydrostatic forces should not be construed to be the only means to achieve the seal between the ring member 328 and the housing. In this embodiment, the expansion of the expandable ring 330 through contact with the containing surfaces of the annular chamber 326 and with the ring member 328 provides a complementary sealing effect. Or through careful selection of the shapes of the annular chamber 326 and the expandable ring 330 some of the forces generated by the expansion of the expandable ring 330 could be directed in an upward axial direction onto the ring member 328 complementing the upward axial acting hydrostatic forces of the sealed fluid, in achieving and maintaining contact between the upper face of the ring member 328 and the opposing surface of the annular chamber 326.

Generally, it will be appreciated that the effects of the thermal expansion of the expandable ring (or analogous element) 330 can be tailored, inter alia, via the selection of the shape and volume of chamber 326 and the shape and area of contact between ring 330 and ring member 328. It is also conceivable to introduce one or more intermediary elements between ring 330 and ring member 328 to, e.g., act as "dampers" to fine-tune the control of radial displacements or as "spreaders" to more evenly distribute the compressive loads. It should be noted that ring 330 could be a single unitary piece continuous ring or it could be comprised of multiple contiguous ring sections or formed segments as long as it fills the volume defined by the boundaries of chamber 326 and deformable ring member 328 as described.

Generally, the embodiment described and illustrated with respect to FIGS. 3A/3B will be particularly well suited to a setting where a likely precipitating event requiring activation of a shutdown or backup seal is associated with elevated temperatures, such as a reactor coolant pump. The embodiment described and illustrated with respect to FIGS. 3A/3B has an optional retaining ring 334. The retaining ring 334 provides an adequate sealing surface for ring member 328 to seal against. A retaining ring is not necessary if the surface of the housing 312a that comprises the top surface of the chamber 326 is in good condition and can provide a good seal with the top surface of the ring member 328. If provided, the retaining ring 334 also allows better definition of the inner diameter which defines the extrusion gap with the outer diameter of the shaft 318. In existing equipment, the housings can have more variation in this inner diameter. The retaining ring 334 also facilitates bench assembly of the device into the insert component, a replaceable subcomponent of a pump housing, so that the device can be installed as a unit with the replacement of the insert which is a routine maintenance operation. This simplifies installation in the field, eliminating the need to handle small parts in a critical assembly sequence. The retaining ring 334 has an interference fit between its outer diameter and the inner diameter bore of the insert. This provides a seal between the retaining ring 334 and the insert to prevent bypass leakage around the device.

The embodiment described and illustrated with respect to FIGS. 3A/3B has an optional floating anti-extrusion ring 336. The anti-extrusion ring 336 may be formed from a harder material such as metal, and may be recessed into the downstream face at an inner diameter portion of a deformable ring member 328. Such an anti-extrusion ring could be split in similar manner as the ring member 828 described below with reference to FIGS. 8A and 8B and the "split ring" disclosed in the '994 application. In this case, as an anti-extrusion ring, the relaxed condition of the split ring is with the ends separated with an inner diameter equal or somewhat larger than the inner diameter of the deformable ring member 328. The outer diameter of the split ring 336 is constrained by the inner diameter of a counterbored recess in the deformable ring member 328. Accordingly, in an initial, unconstructed or undeformed condition of the deformable ring member 328, the anti-extrusion ring 336 describes an inner diameter that is larger than the outer diameter of the shaft while also approximating the inner diameter of the deformable ring member 328. Thence, as the deformable ring member 328 constricts about or otherwise closes in upon the shaft 318, the anti-extrusion ring 336 will also deform such that its split ends draw together. Essentially, such an anti-extrusion ring 336 can function to prevent any material from the deformable ring member 328 to extrude (e.g., in a downstream direction) by bridging a significant portion of the gap between the retaining ring 334 (or housing) and the shaft 318 as a supporting member for the deformable ring 328.

Figure 4A:
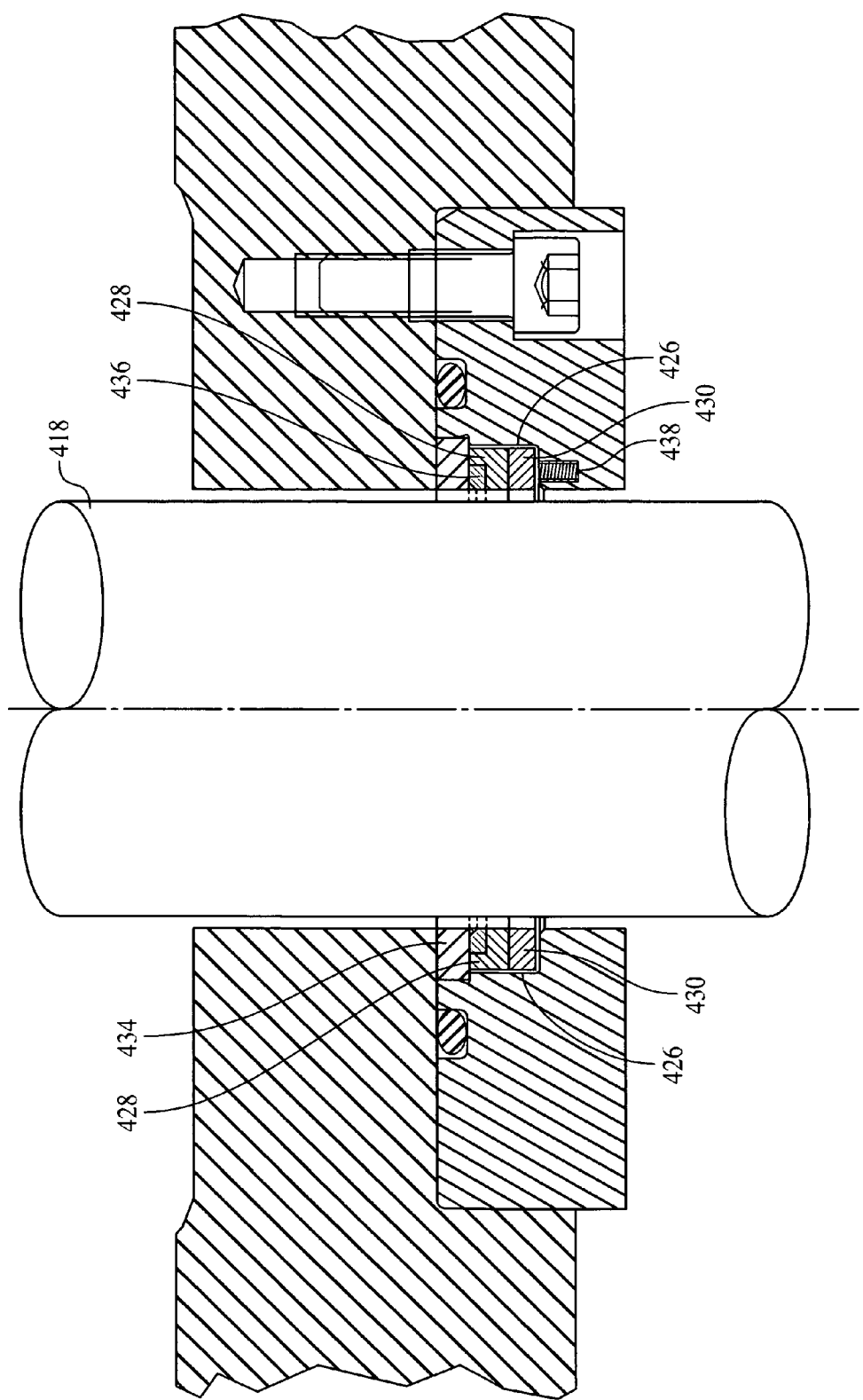
FIG. 4A illustrates schematically a cross-sectional, elevational view of a second deformable ring arrangement about a shaft, in an initial general condition.

FIG. 4A illustrates schematically a cross-sectional, elevational view of a second deformable ring arrangement about a shaft, in an initial general condition. As shown, an annular chamber 426 may be disposed about shaft 418. Preferably contained therein is a continuous and deformable ring member 428 circumscribing or surrounding the shaft 418. An actuation element 430 is disposed upstream of ring member 428 and within annular chamber 426. Actuation element 430 can take any of a wide variety of forms, as now will be appreciated. Chamber 426 is configured in a manner to promote the behavior now to be discussed.

In accordance with one variant embodiment of the invention, actuation element 430 can preferably be provided in the form of a "split ring" arrangement as discussed in copending and commonly assigned U.S. patent application Ser. No. 11/340,994 (Publ. No. US 2007/0172367), hereafter "the '994 application". This U.S. Patent Application Publication is fully incorporated by reference herein as if set forth in its entirety herein, and can be relied upon for background information relating to this and other embodiments.

Figure 4B:
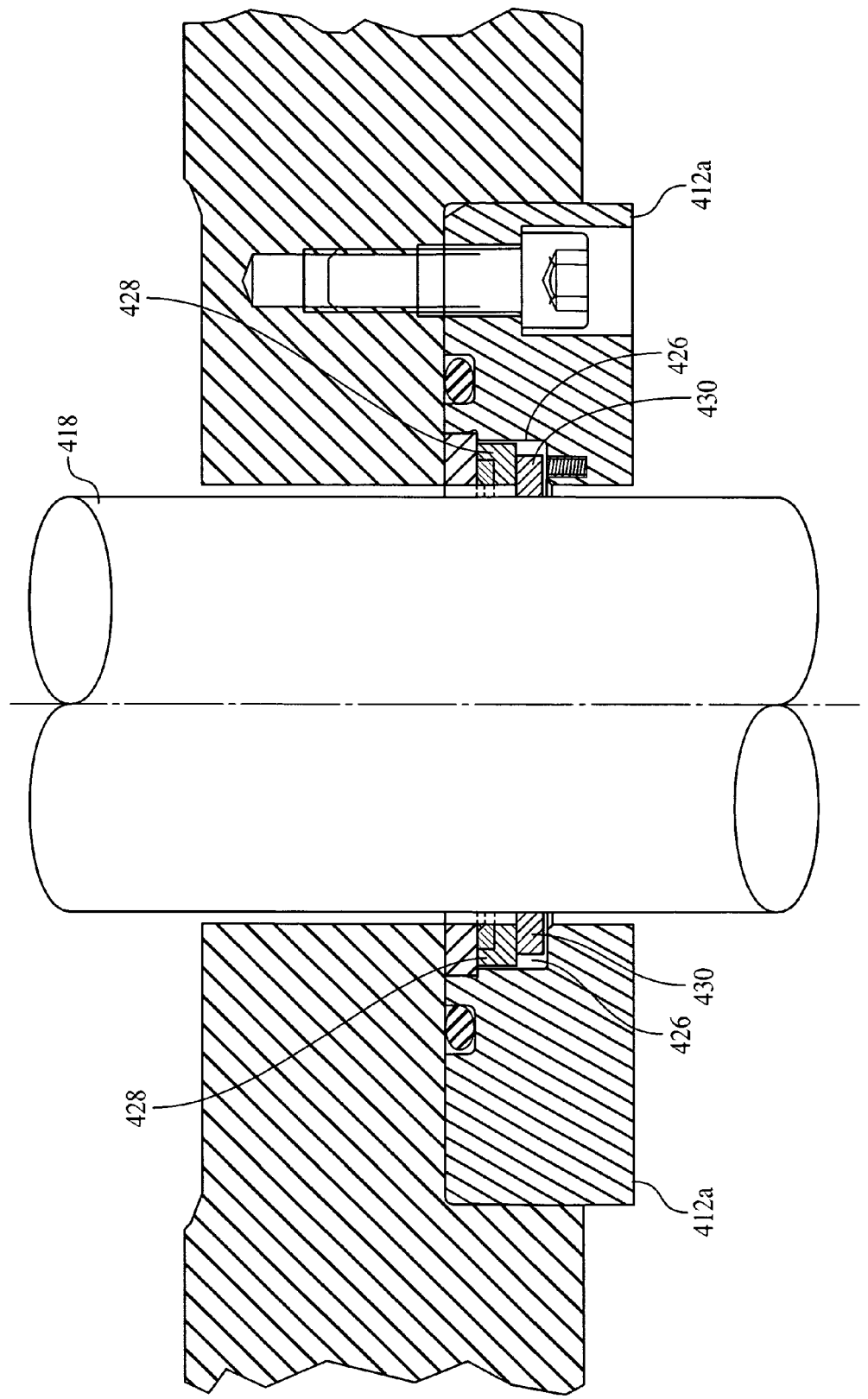
FIG. 4B is essentially the same view as FIG. 4A but showing the deformable ring arrangement actuated into an intermediate general condition.
Figure 4C:
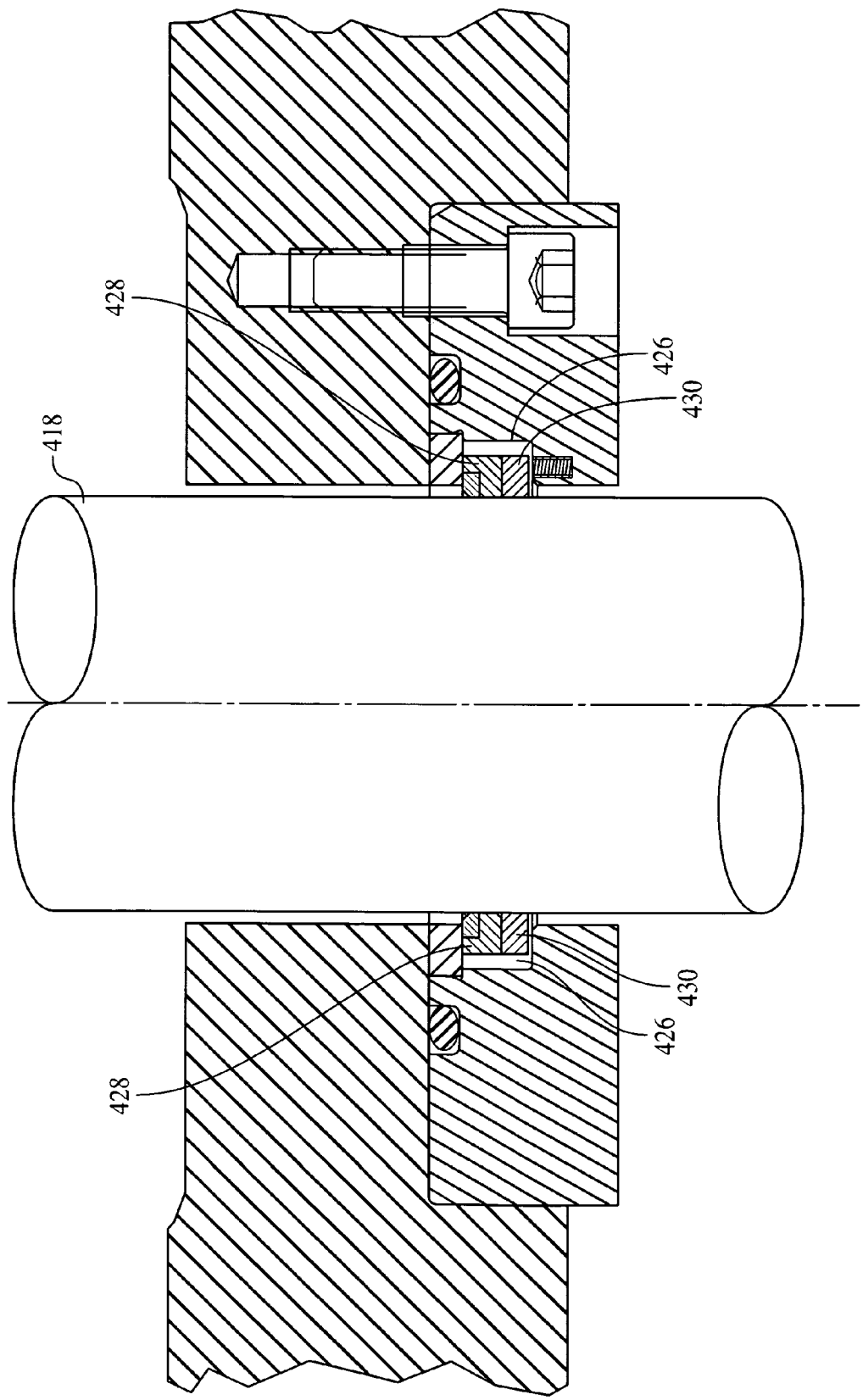
FIG. 4C is essentially the same view as FIG. 4A but showing the deformable ring arrangement actuated into a second, constricted general condition.
Figure 4D:
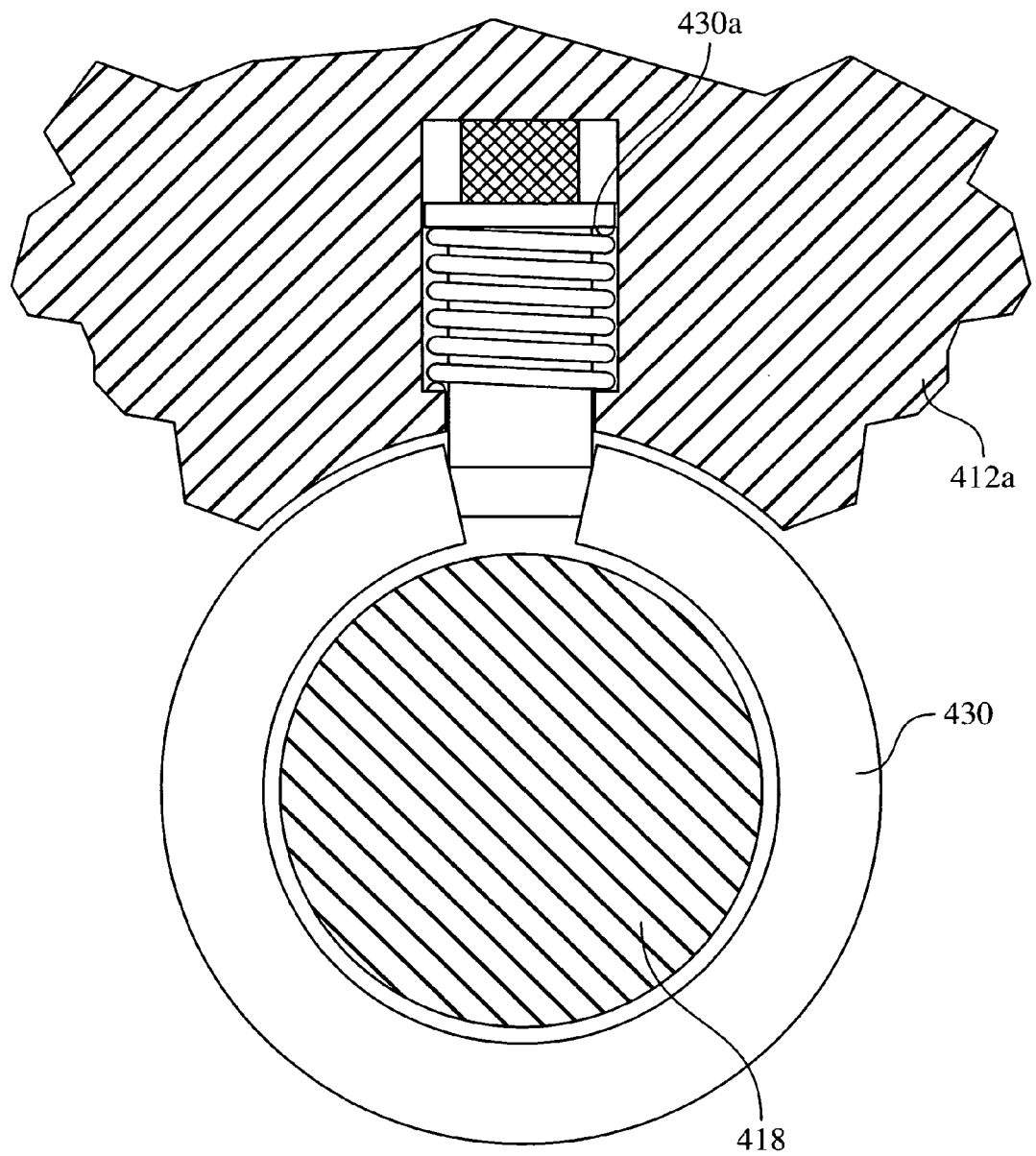
FIG. 4D illustrates the deformable ring arrangement from FIGS. 4A-4C in plan view showing a mechanical actuator in an initial general condition.
Figure 4E:
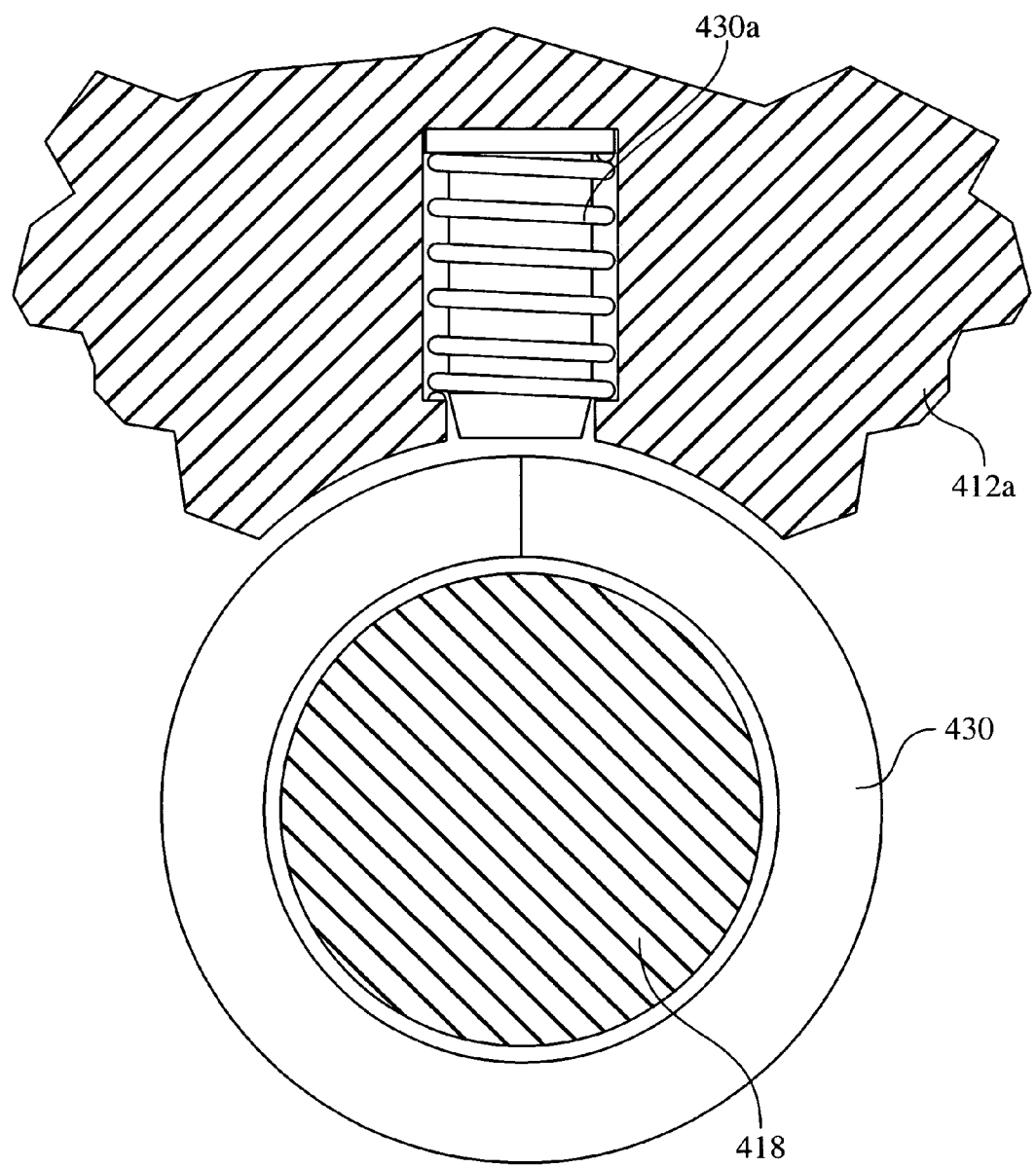
FIG. 4E illustrates the deformable ring arrangement from FIGS. 4A-4C in plan view showing a mechanical actuator after actuation.
Figure 4F:
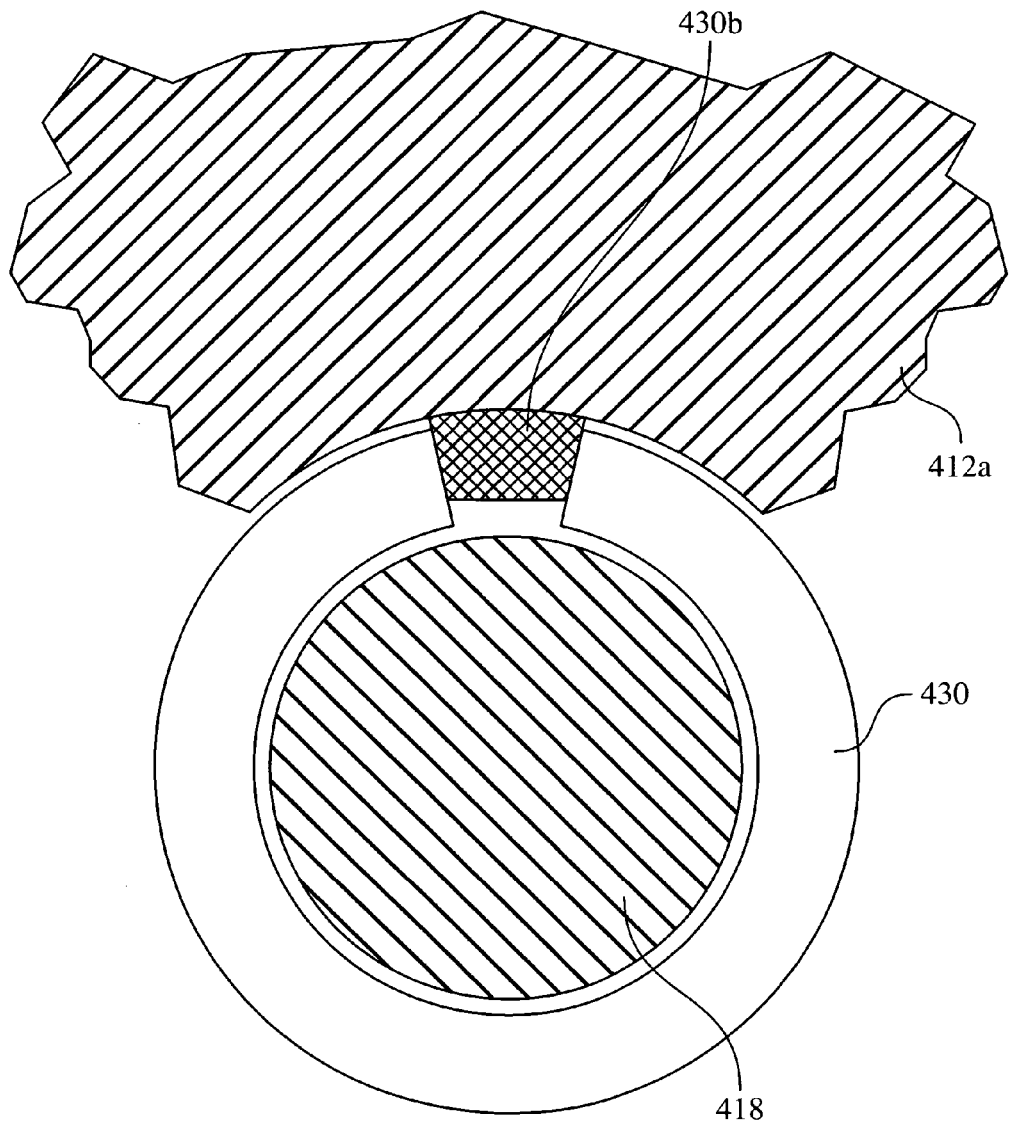
FIG. 4F illustrates the deformable ring arrangement from FIGS. 4A-4C in plan view showing a melting/dissolving spacer in an initial general condition.
Figure 4G:
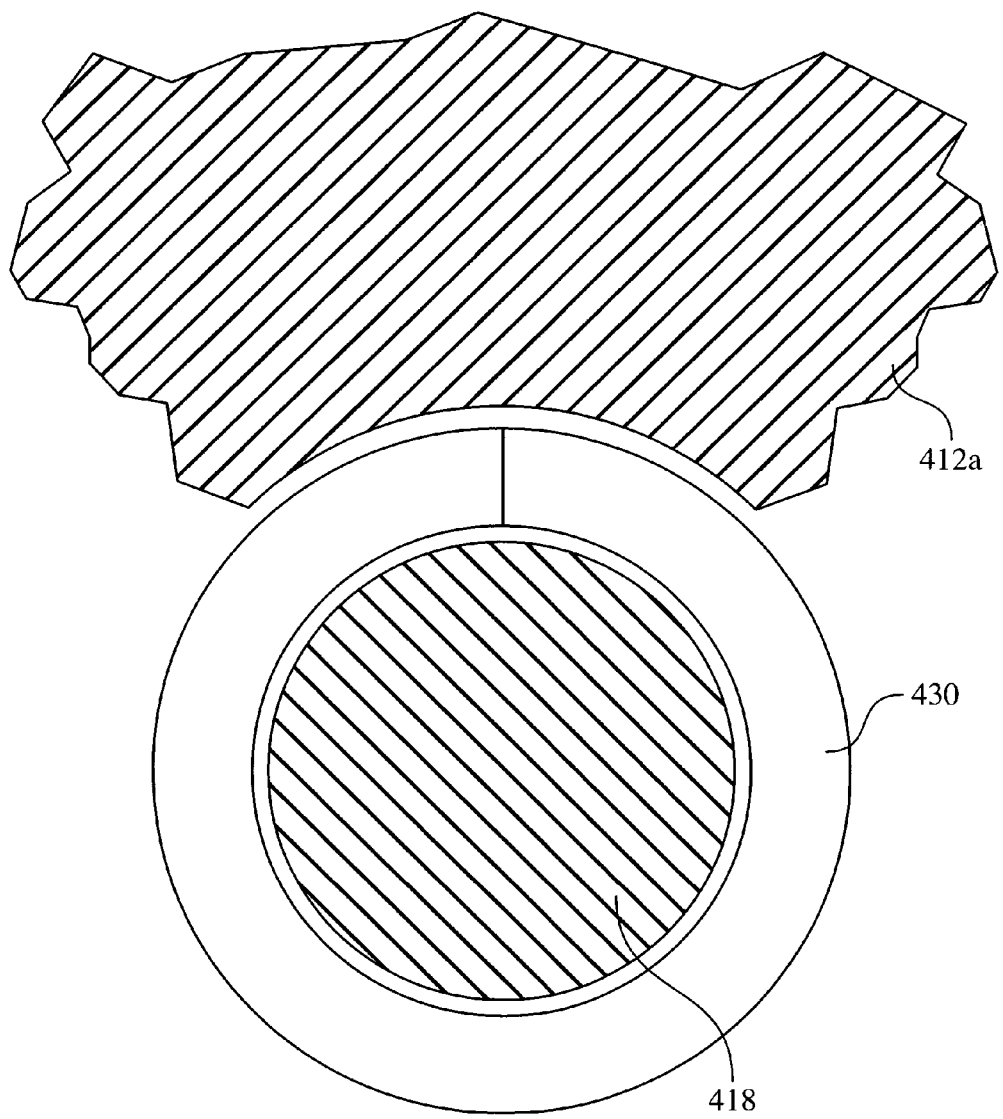
FIG. 4G illustrates the deformable ring arrangement from FIGS. 4A-4C in plan view showing a melting/dissolving spacer after melting/dissolving.

FIGS. 4D and 4F show in plan view the initial condition of a split ring actuation element 430 with the ends of its split being held in an unrelaxed and opened condition by a spacer element 430a, 430b. The spacer element 430a, 430b may be a mechanical retractable plunger 430a as shown in FIG. 4D, or a meltable or dissolvable material 430b as shown in FIG. 4F. These are shown as examples of types of mechanical actuators to provide separation of the ends of a split ring actuation element 430 to maintain it in an expanded diameter condition until actuation of the device is required. FIGS. 4E and 4G show in plan view the intermediate condition as shown in the FIG. 4B. FIG. 4E shows the plunger spacer element 430a retracted from between the ends of the split ring 430 allowing its ends to close and thereby its diameter to constrict to the shaft. Similarly, in FIG. 4G, the spacer element 430b has melted or dissolved permitting the ends of the split ring 430 to close and its diameter to constrict to the shaft 418.

Figure 5A:
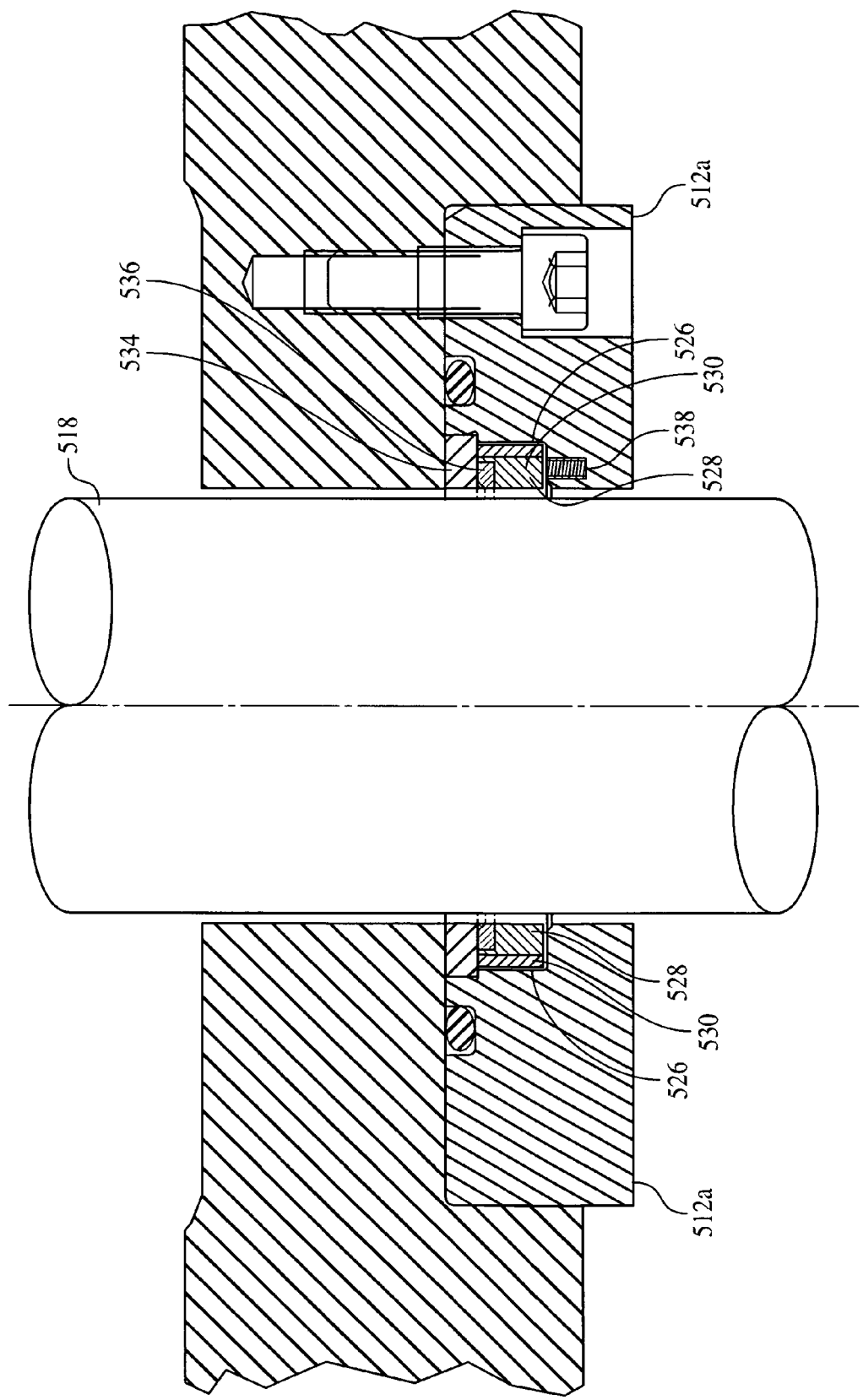
FIG. 5A illustrates schematically a cross-sectional, elevational view of a third deformable ring arrangement about a shaft, in an initial general condition.
Figure 5B:
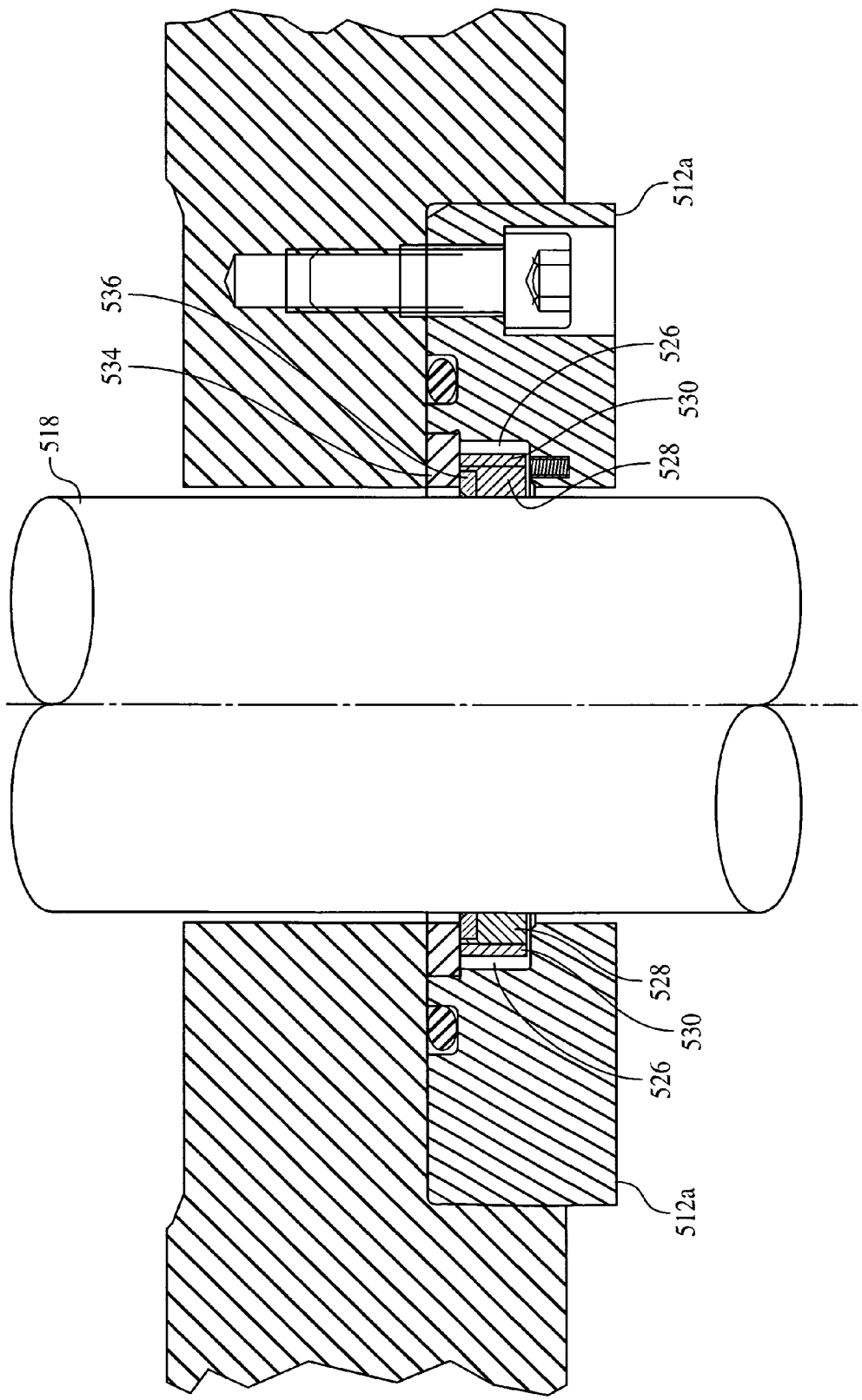
FIG. 5B is essentially the same view as FIG. 5A but showing the deformable ring arrangement actuated into a second, constricted general condition.

In accordance with another variant embodiment of the invention, actuation element 430 can preferably be provided in the form of a shape memory element (e.g., a ring element formed from a shape memory alloy material) as discussed herebelow with reference to FIGS. 5A-5C. In such an arrangement, the shape memory element would act alone in constricting about shaft 418 alone. Further, such a shape memory element could be solid or continuous about the shaft 418, or could be split at some point along the circumference of the element; in either case, the shape memory effects of the element would still cause the ring to close or constrict around the shaft.

As shown in FIG. 4B, actuation element 430, whether in one of the forms just discussed or in any other conceivable and similarly functioning form, will preferably act to provide a partial seal by independently throttling fluid flow along shaft 418, in a direction generally parallel to the central longitudinal axis of shaft 418 and upwardly with respect to FIG. 4B. The differential pressure created from such a partial seal would then have the effect of increasing the pressurization within chamber 426 (at least, increase the pressure relative to the pressure in the annular space between the ring member 428 and the shaft 418), and this will act to apply a radially inward compressive force to deformable ring member 428 that constricts ring member 428 about shaft 418 (as shown in FIG. 4C). Thus, the purpose of actuation element 430 here is generally to partially restrict fluid flow in sufficient manner as to create a differential pressure drop between the pressure acting on the outer diameter of ring member 428 and the pressure acting in the annular space between the inner diameter bore of the ring member 428 and the shaft 418 downstream of the actuation element.

The embodiment described and illustrated with respect to FIGS. 4A/4B/4C has an optional floating anti-extrusion ring 436 and an optional retaining ring 434.

FIG. 5A illustrates schematically a cross-sectional, elevational view of a third deformable ring arrangement about a shaft, in an initial general condition. As shown, an annular chamber 526 may be disposed about shaft 518. Preferably contained therein is a continuous and deformable ring member 528 circumscribing or surrounding the shaft 518, with an actuation element in the form of a shape memory element 530 circumscribing or surrounding, and preferably contacting the outer diameter of, ring member 528.

Ring member 528 preferably functions in a manner as discussed generally hereinabove, that is, it preferably deforms, in a radially inward direction with respect to a central longitudinal axis of shaft 518, in response to actuation in the form of constriction. Here, shape memory element 530 provides such actuation. Preferably, shape memory element 530 may be formed from a shape memory alloy metal. Generally, shape memory materials as may be employed with embodiments of the invention herein can be understood as materials that normally assume an initial, undeformed "memory" shape and that can be plastically deformed into any other shape, whereupon a predetermined stimulus (e.g., rise in temperature above a predetermined threshold) will cause the material to revert back to the undeformed memory shape.

Preferably, the shape memory element 530 unbrokenly circumscribes ring member 528 so as to be able to provide a radially inwardly compressive or constricting force to the entire outer circumference of ring member 528. Preferably, this is brought about via shape memory characteristics of element 530 as just discussed. Accordingly, in the view of FIG. 5A, in an initial condition of ring member 528, a fluid flow path sufficient for permitting a normal throughput of fluid (in a direction generally parallel to the central longitudinal axis of shaft 518) is present and element 530 is in an expanded and deformed state. In response to a temperature increase above a threshold, then, element 530 is urged to revert to its constricted memory state (as shown in FIG. 5B), whereby ring member 528 is compressed and constricted about shaft 518 and thereby throttles or fully blocks the normal throughput of fluid.

While it is conceivable to realize a constricting seal that employs a constricting shape memory material (similar to element 530) but does not include a deformable ring member (similar to element 528) nested therewithin, it should be appreciated that the combination of a deformable ring member nested within a ring of shape memory material is likely to yield significant advantages. Particularly, such a "nested composite" is likely to result in enhanced conformability about a shaft as compared to the use of a shape memory material alone, in addition to an enhanced control of friction and greater sensitivity to manufacturing tolerances and processes. However, it can also be appreciated that the use of a shape memory material alone can readily provide an initial, partial seal that can readily be augmented by a downstream seal employing a deformable plastic ring (as discussed hereabove with relation to FIG. 4.)

The embodiment described and illustrated with respect to FIGS. 5A/5B has an optional floating anti-extrusion ring 536 and an optional retaining ring 534 within housing 512a.

Figure 6A:
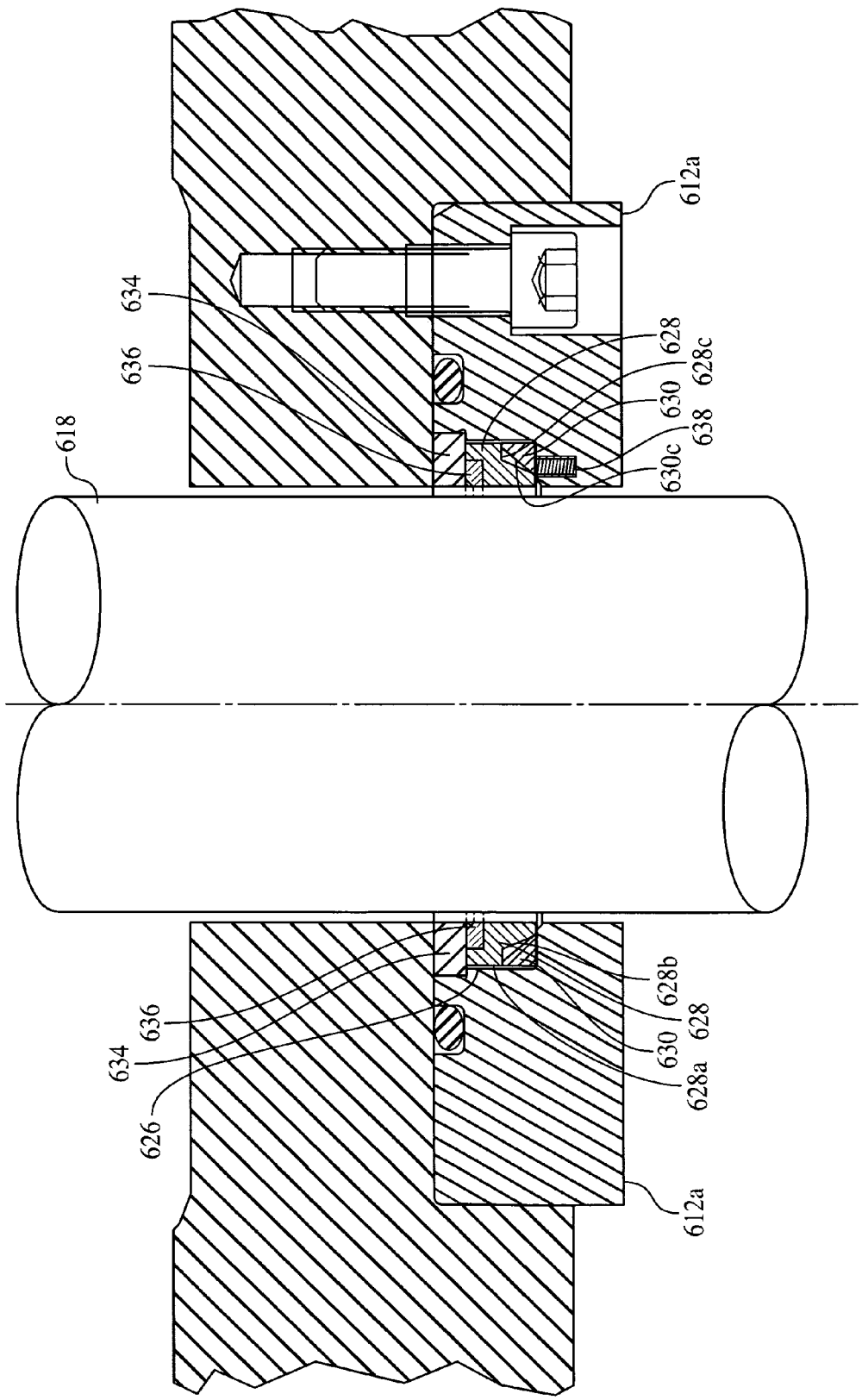
FIG. 6A illustrates schematically a cross-sectional, elevational view of a fourth deformable ring arrangement about a shaft, in an initial general condition.
Figure 6B:
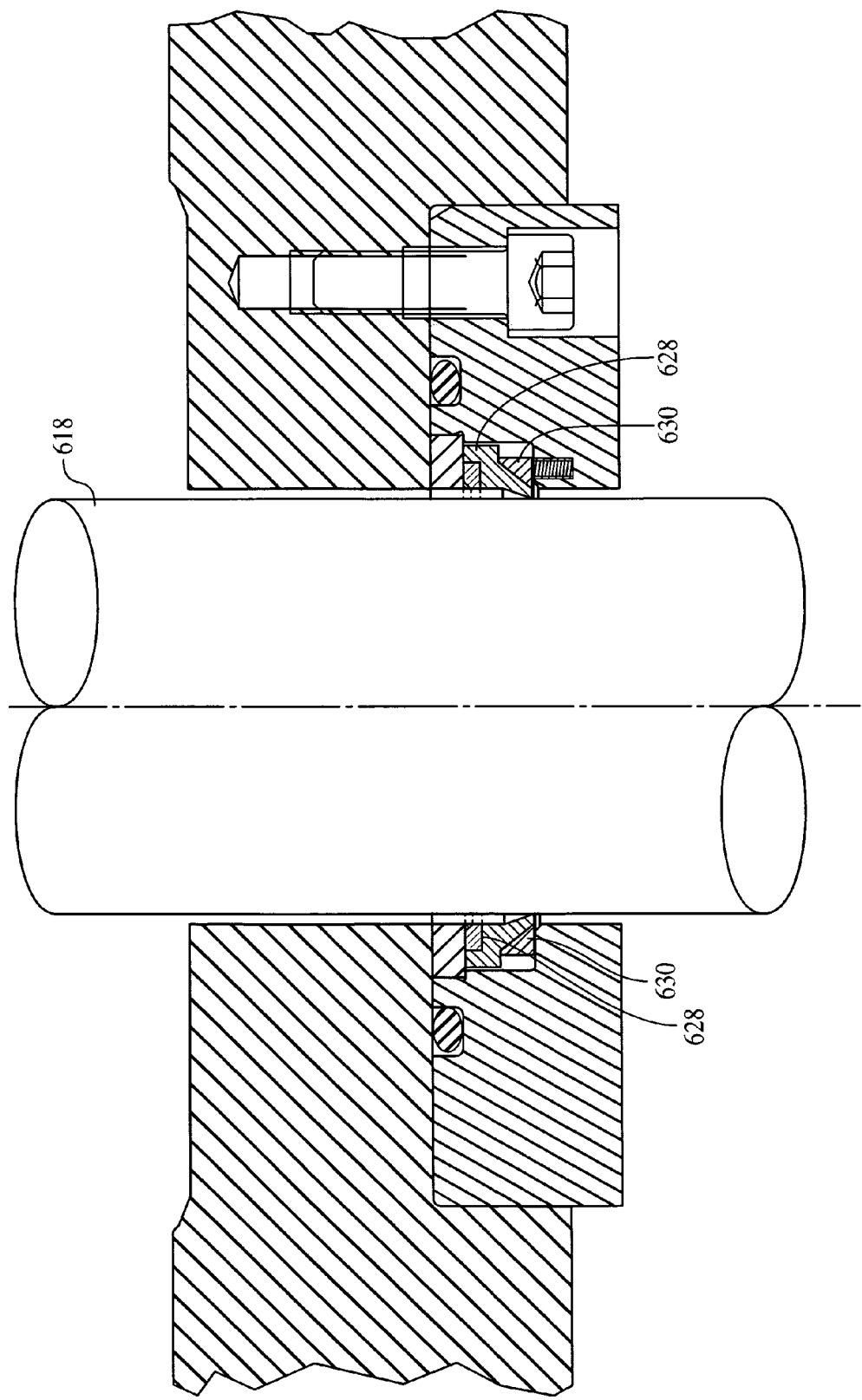
FIG. 6B is essentially the same view as FIG. 6A but showing the deformable ring arrangement actuated into a first intermediate general condition.

FIG. 6A illustrates schematically a cross-sectional, elevational view of a fourth deformable ring arrangement about a shaft, in an initial general condition. Here, and in FIGS. 6B-6D, a variant with respect to the embodiment of FIGS. 5A-5B is realized.

Again, an annular chamber 626 may be disposed about shaft 618. Preferably contained therein is a continuous and deformable ring member 628 circumscribing or surrounding the shaft 618, with an actuation element in the form of a shape memory element 630 circumscribing or surrounding, and preferably contacting at least a portion of the outer periphery of, ring member 628.

Here, however, ring member 628 preferably includes a variable outer diameter. As shown in FIGS. 6A-6D, ring member 628 has an upper portion 628A having a larger outer diameter and a lower portion 628B having a smaller outer diameter. The upper portion 628A and the lower portion 628B are joined by a radial portion 628C. Shape memory element 630 is positioned outside of the outer diameter of lower portion 628B. As shown in FIGS. 6A-6D, shape memory element 630 has a generally right-triangular wedge shape with its hypotenuse 630A positioned between lower portion 628B and radial portion 628C. Generally, it should be understood that the shapes, configurations and relative dimensions of a deformable ring 628 and shape memory element 630, as shown in FIGS. 6A-6D, are provided merely by way of illustrative and non-restrictive examples.

Preferably, as shown in FIG. 6A, in an initial, general condition of deformable ring 628, shape memory element 630 is itself in a plastically deformed, expanded state so as to circumscribe and contact ring 628 at least a portion of ring 628 of generally smaller outer diameter. Thence, in initial response to a rise in temperature (e.g., fluid temperature) above a predetermined threshold, shape memory element 630 will preferably begin to revert to its undeformed, constricted state and thus will constrict ring 628 at least portions of smaller outer diameter of ring 628.

Figure 6C:
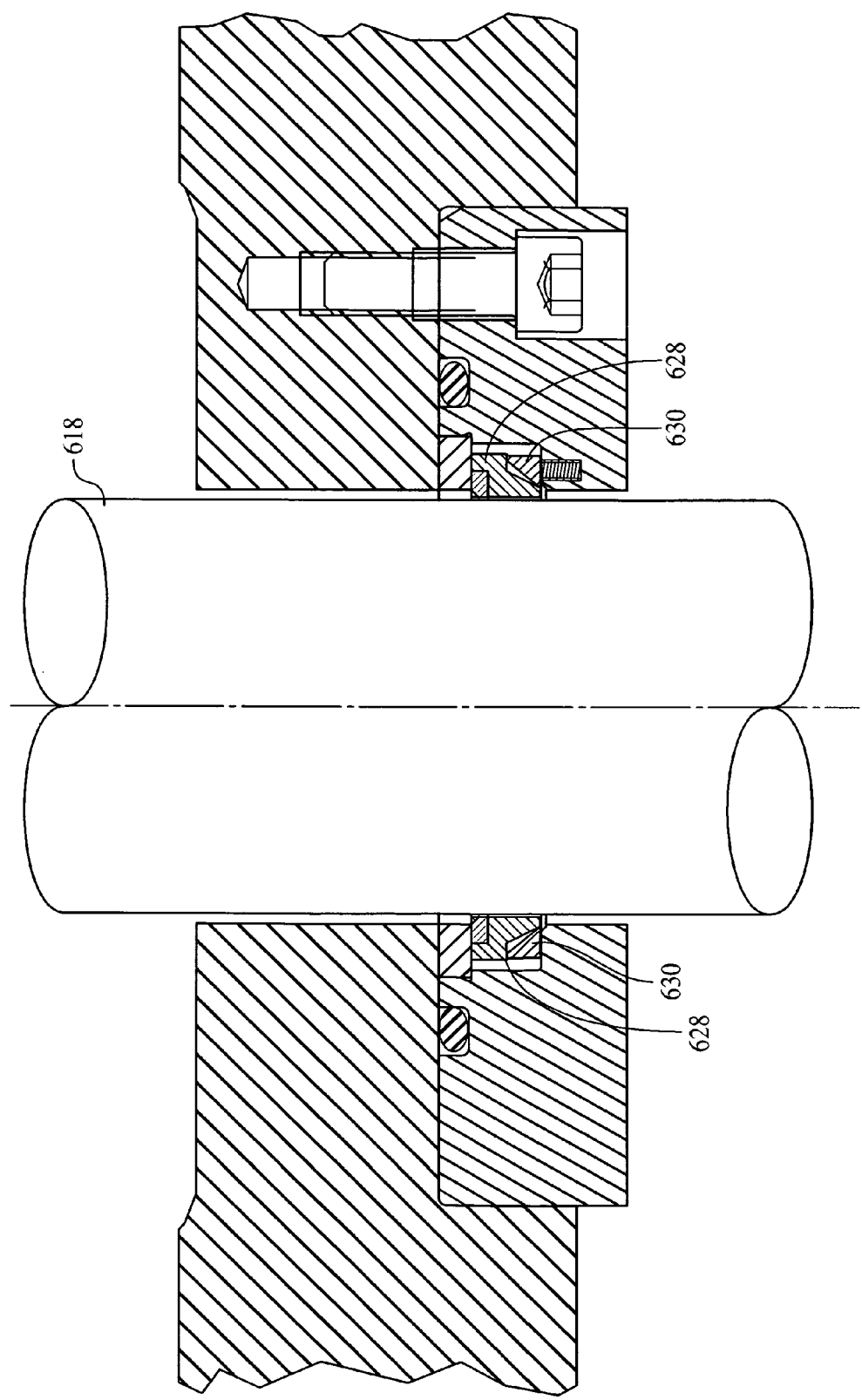
FIG. 6C is essentially the same view as FIG. 6A but showing the deformable ring arrangement actuated into a second intermediate general condition.
Figure 6D:
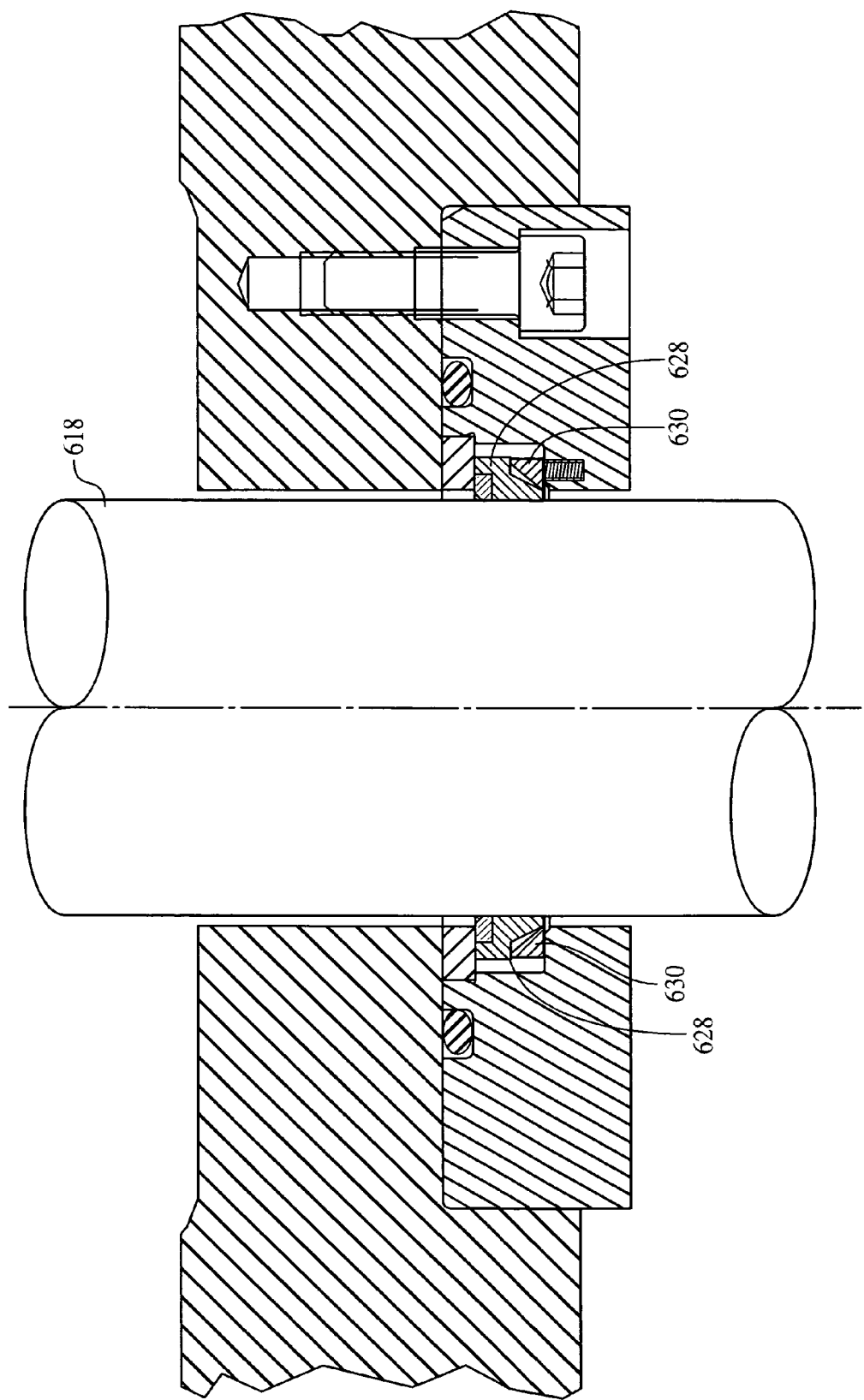
FIG. 6D is essentially the same view as FIG. 6A but showing the deformable ring arrangement actuated into a constricted general condition.

This initial constriction of smaller-outer diameter portions of deformable ring 628, then, will have the immediate effect of throttling at least a portion of the fluid flow along shaft 618 and, in like manner as the embodiment described above with relation to FIG. 4, will cause a decrease in the pressure in the annular region between the inner diameter bore of the ring member 628 and the shaft 618 relative to the pressure in the chamber 626. This creates a differential pressure drop between the outer diameter and inner diameter of the ring member 628 that is sufficient for providing at least an additional constricting force on ring member 628 at larger-outer diameter portions of ring member 628. This differential pressure drop will then cause deformable ring 628 to constrict about the shaft as shown in FIG. 6C. Then, as shown in FIG. 6D, shape memory element 630 may preferably continue to constrict in reverting back to its original undeformed state and, once in that state, preferably fully contacts, and functionally integrates with, deformable ring member 628. Thus, it will be appreciated that while the shape memory element 630 has acted to constrict about, and deform, deformable ring 628, it will have been considerably aided in this function by the additional constricting force provided by the differential pressure drop just mentioned.

As can be appreciated from FIGS. 6A-6D, the context of a variable-outer diameter deformable ring member 628 provides an added advantage of promoting an additional effective axial force (in a downstream direction) on ring member 628. This would aid in holding the downstream face of ring member 628 against housing 612a (or the downstream axial limit of chamber 626) and also helping to prevent any axial movements of shaft 618 from unseating the ring member 628.

The embodiments described and illustrated with respect to FIGS. 6A-6H have an optional floating anti-extrusion ring 636 and/or an optional retaining ring 634.

Figure 6E:
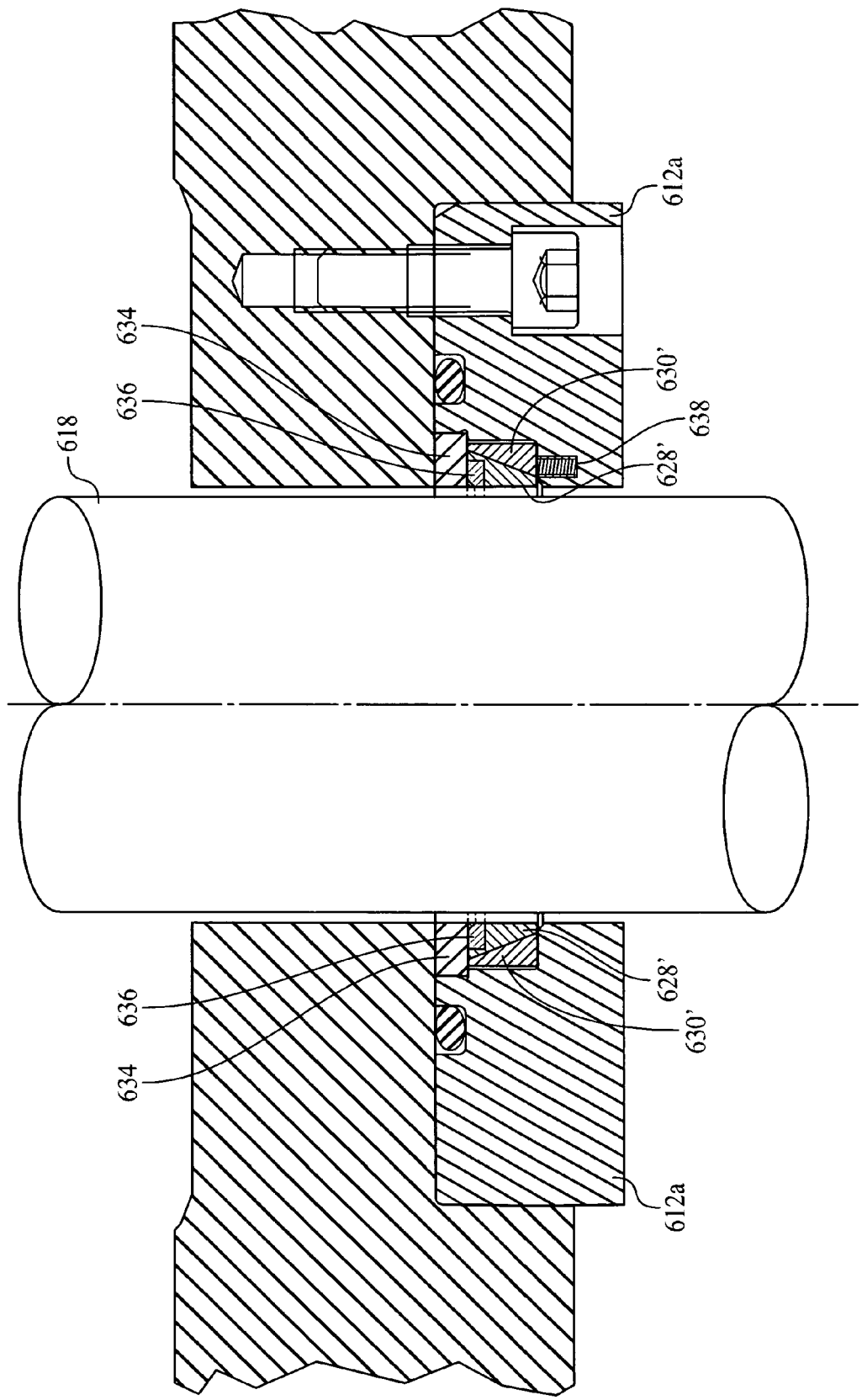
FIG. 6E illustrates schematically a cross-sectional, elevational view of a variation of the embodiment shown in FIGS. 6A-6D showing a deformable ring arrangement about a shaft, in an initial general condition.
Figure 6F:
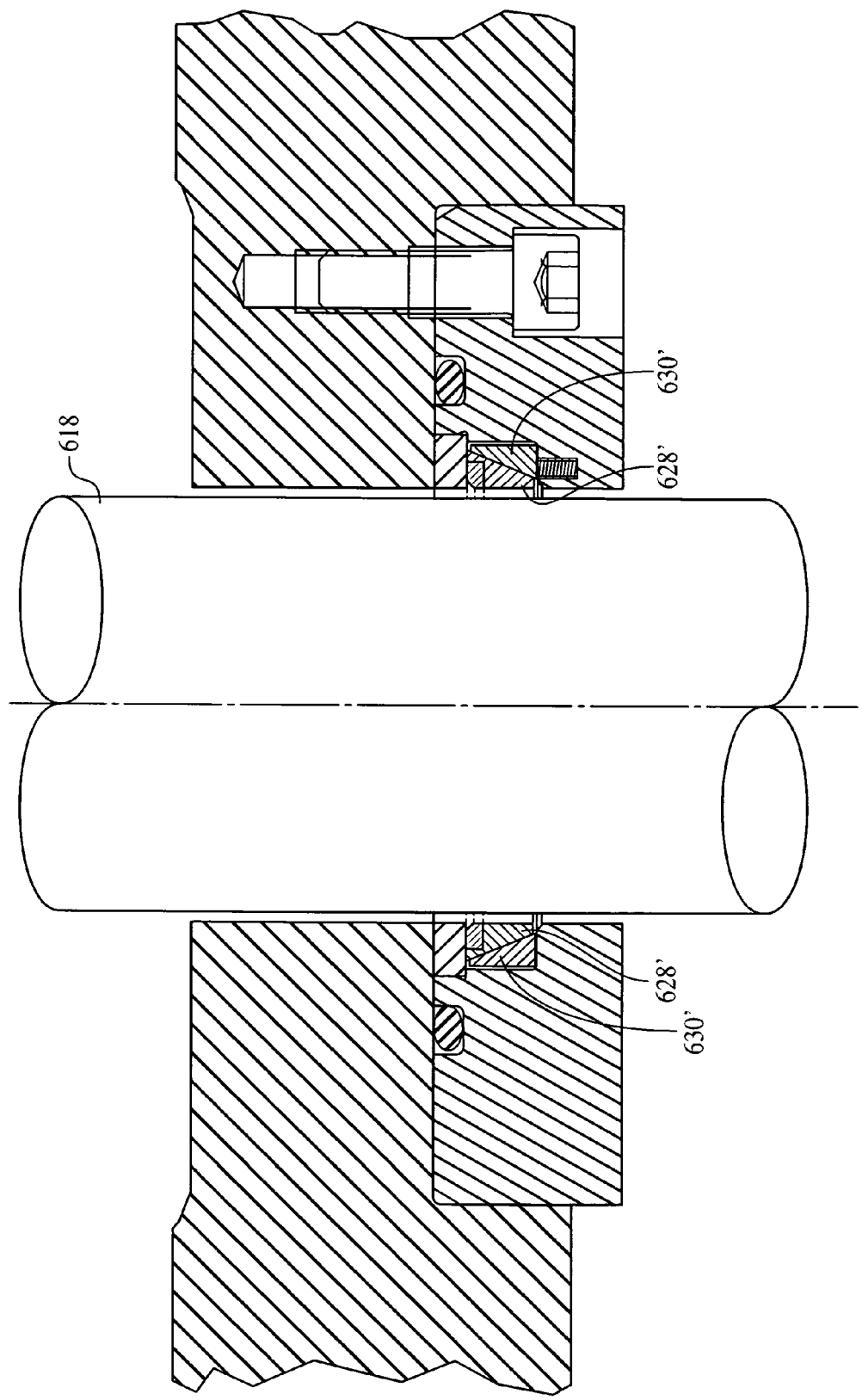
FIG. 6F is essentially the same view as FIG. 6E but showing the deformable ring arrangement actuated into a first intermediate general condition.
Figure 6G:
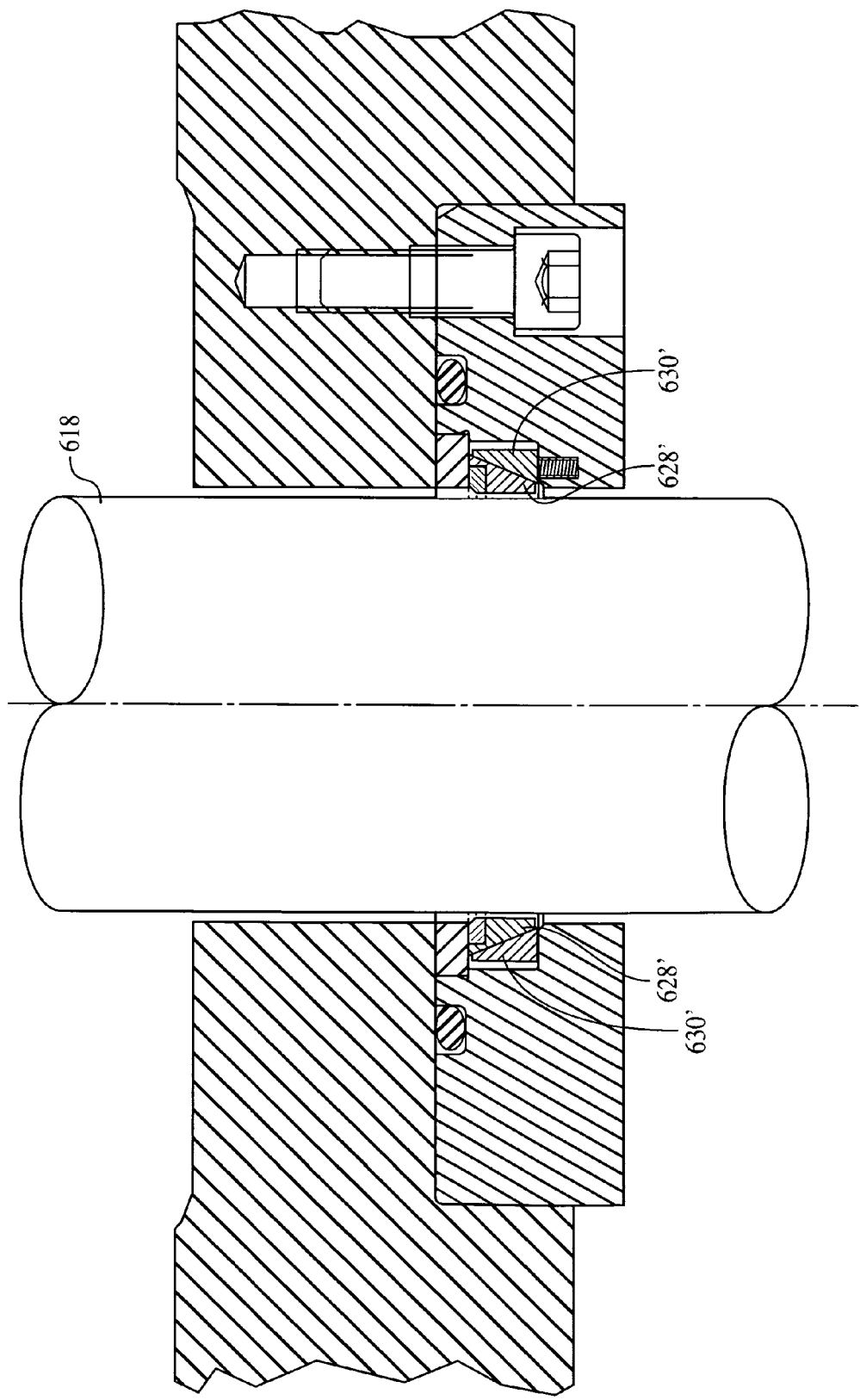
FIG. 6G is essentially the same view as FIG. 6E but showing the deformable ring arrangement actuated into a second intermediate general condition.
Figure 6H:
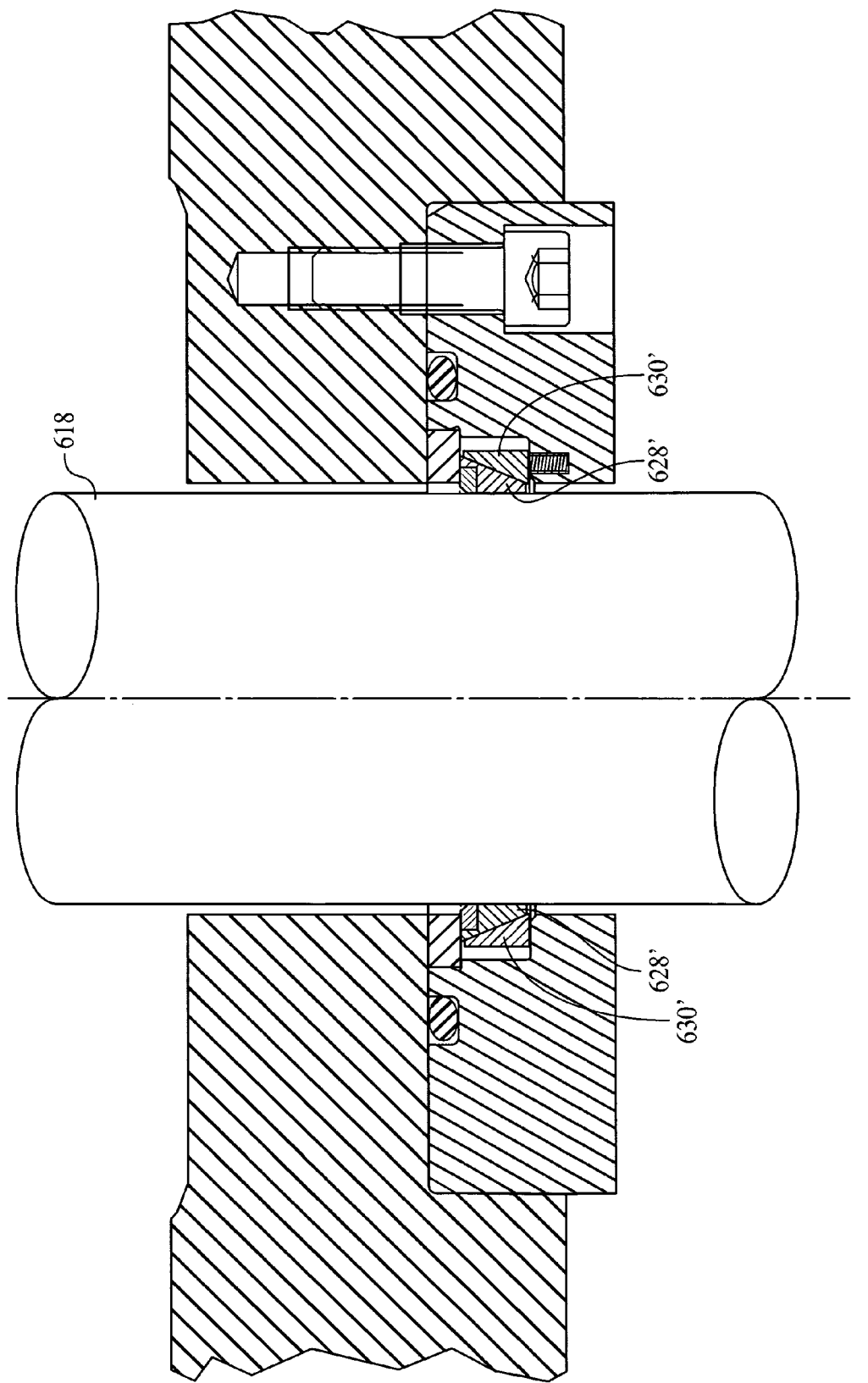
FIG. 6H is essentially the same view as FIG. 6E but showing the deformable ring arrangement actuated into a constricted general condition.

While a non-linear variation in outer diameter is shown in FIGS. 6A-6D, essentially any type of transition in the variable outer diameter is conceivable (e.g., the cross-sectional profile of the outer diameter could be arcuate). FIGS. 6E-6H illustrate a linear variation in diameter. As shown in FIGS. 6E-6H, ring member 628' has an upper portion having a larger outer diameter and a lower portion having a smaller outer diameter while shape memory element 630' has a has an upper portion having a larger inner diameter and a lower portion having a smaller inner diameter. The beveled surface between the outer diameter of ring member 628' and the inner diameter of shape memory element 630' provides a wedging action. FIG. 6E illustrates an unactuated stage. FIG. 6F illustrates a stage in which the shape memory element 630' initiates a wedging action to seat ring member 628' upward against retaining ring 634. FIG. 6G illustrates a stage in which the beveled surface provides a wedging action with the ring member 628' constricting towards the shaft 618. FIG. 6H illustrates a stage in which the shape memory element 630' is fully actuated to force the ring member 628' to contact the shaft 618.

Figure 7A:
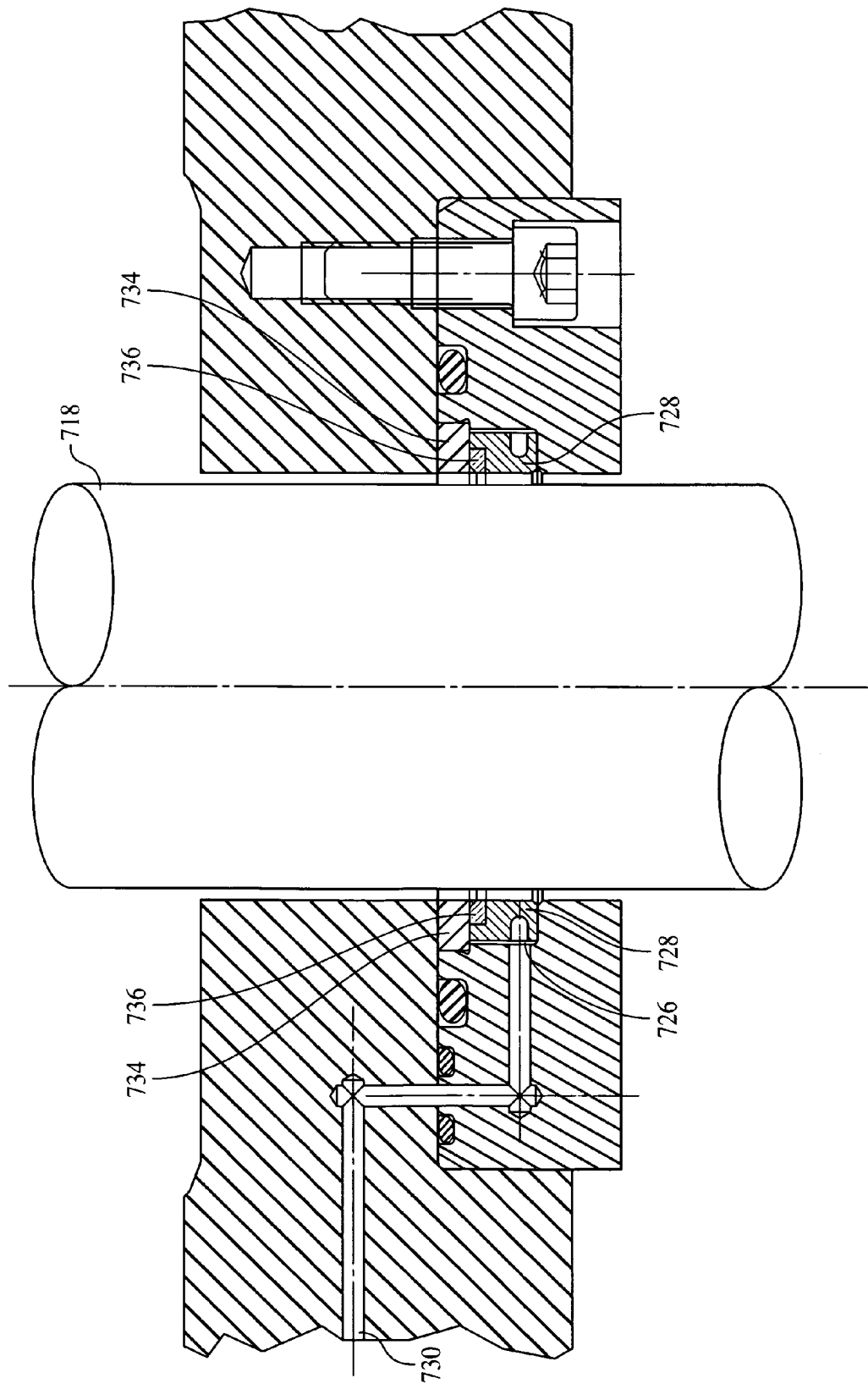
FIG. 7A illustrates schematically a cross-sectional, elevational view of a fifth deformable ring arrangement about a shaft, in an initial general condition.

FIG. 7A illustrates schematically a cross-sectional, elevational view of a fifth deformable ring arrangement about a shaft, in an initial general condition. As shown, an annular chamber 726 may be disposed about shaft 718. Preferably contained therein is a deformable ring member 728 circumscribing or surrounding the shaft 718.

Here, continuous and deformable ring member 728 is preferably constrained within chamber 726 in such a way that axially upstream and downstream faces of ring member 728 are in contact with cooperating axially upstream and downstream faces of chamber 726, such that virtually only radial movement and play of ring member 728 is possible. As such, actuating element 730 may preferably be in the form here of a supplementary device or arrangement that acts to pressurize chamber 726 so as to promote the radial deformation and thus constriction of ring member 728 about shaft 718.

Actuating element 730 here can take any of a very wide variety of conceivable forms, including but by no means limited to a dedicated pressure control, a conduit for sourcing fluid from a separate higher-pressure region or essentially any type of automatic or manual actuating/pressurizing arrangement. For instance, actuating element 730 could be embodied by an external high pressure source such as a nitrogen bottle, which would be connected to the pump or pumps by an appropriate piping and manifold system. The actuation of a valve by a manual or automatic medium (such as an electronically or mechanically controlled medium) would provide pressure from the nitrogen bottle to pressurize the chamber 726 to a level above that of the sealed fluid in the region of the device. The radially acting pressure loads so generated would then compel the ring 728 to collapse and constrict about the shaft 718.

The embodiment described and illustrated with respect to FIGS. 7A-7D has an optional floating anti-extrusion ring 736 and an optional retaining ring 734.

Figure 7B:
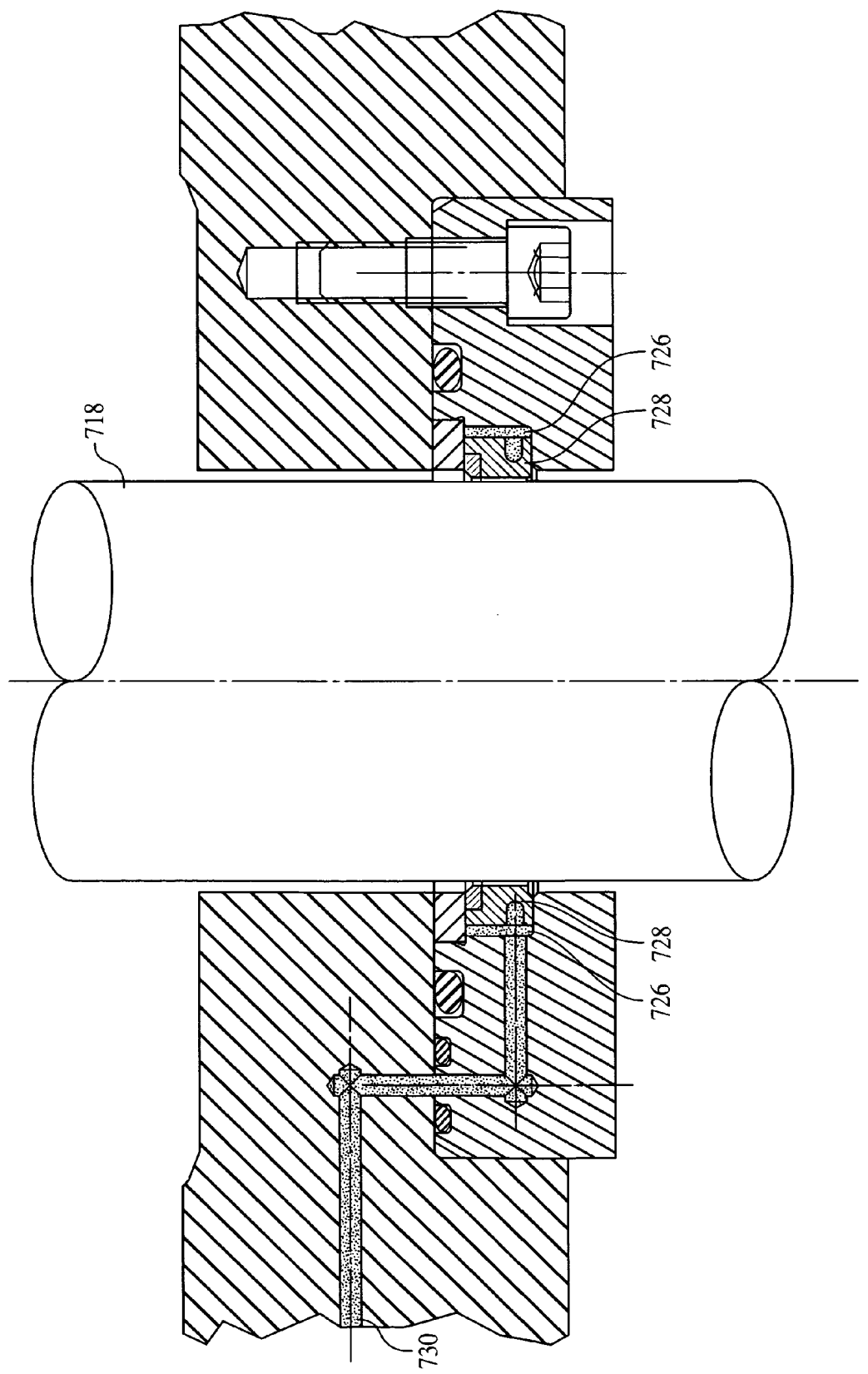
FIG. 7B is essentially the same view as FIG. 7A but showing the deformable ring arrangement actuated into an intermediate general condition.
Figure 7C:
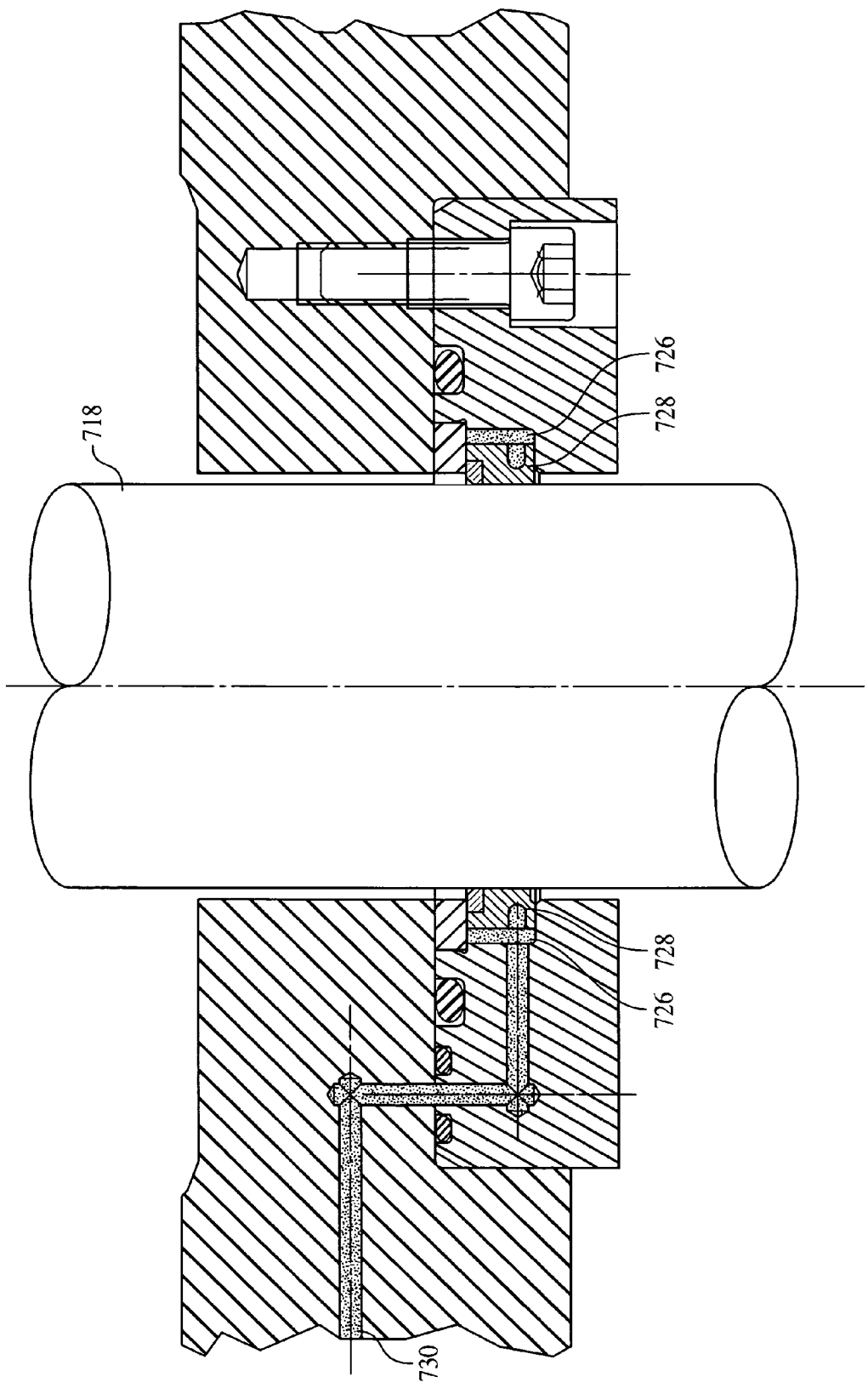
FIG. 7C is essentially the same view as FIG. 7A but showing the deformable ring arrangement actuated into a fully actuated general condition.
Figure 7D:
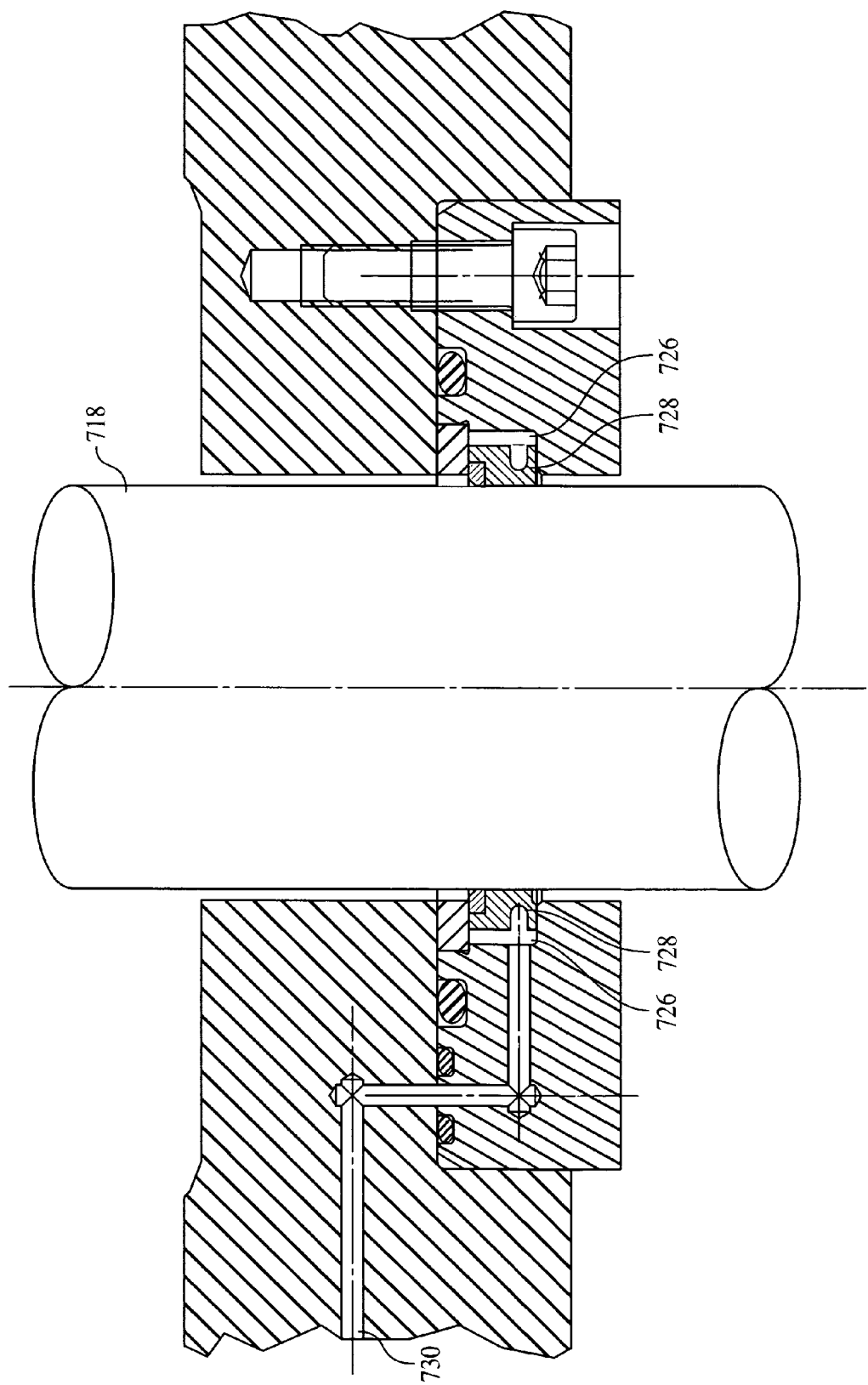
FIG. 7D is essentially the same view as FIG. 7A but showing the deformable ring arrangement actuated into a fully actuated condition with the external pressure removed.

FIGS. 7B-7D illustrate schematically a cross-sectional, elevational views of a fifth deformable ring arrangement about a shaft, in various stages of actuation. FIG. 7B illustrates a stage in which external pressure is applied to the outer diameter of ring 728 causing it to constrict toward shaft 718. FIG. 7C illustrates the ring 728 in fully actuated condition in which external pressure is applied to the outer diameter of ring 728 causing it to contact shaft 718 and seal. FIG. 7D illustrates the ring 728 in fully actuated condition with the external pressure removed. The sealed upstream pressure maintains the constriction and seal of ring 728. The relief shown on the lower portion of the outside diameter of deformable ring 728 acts to facilitate axial deflection of the lower leg of the deformable ring 728 when the external pressure 730 is applied. This enhances the sealing of the faces of the deformable ring 728 with their cooperating upstream and downstream faces within the chamber 726. If external pressure 730 is removed the pressure differential between the high upstream pressure and the pressure in the chamber 726 would cause the lower leg of deformable ring 728 to deflect to break its seal against its cooperating upstream face of chamber 726. This would permit the equalization of the chamber pressure with the high upstream pressure thereby maintaining radial pressure loading on the deformable ring 728 and maintaining the ring in a constricted state.

In accordance with one advantageous variant, particularly in the context of a reactor coolant pump, it should be appreciated that at the initiation of a loss of cooling event a "No. 1" seal further upstream may still be functioning such that the majority of coolant system pressure will still be dropped across the "No. 1" seal. About the deformable ring 728, however, the pressure in chamber 726 will typically be much lower. Thus, actuating element 730 here could be embodied merely by fluid communication between chamber 726 to a higher pressure region upstream of the No. 1 seal, via e.g. an automatic or manual valve or other valve-like actuation device that would admit supplementary pressurization to chamber 726.

Figure 8A:
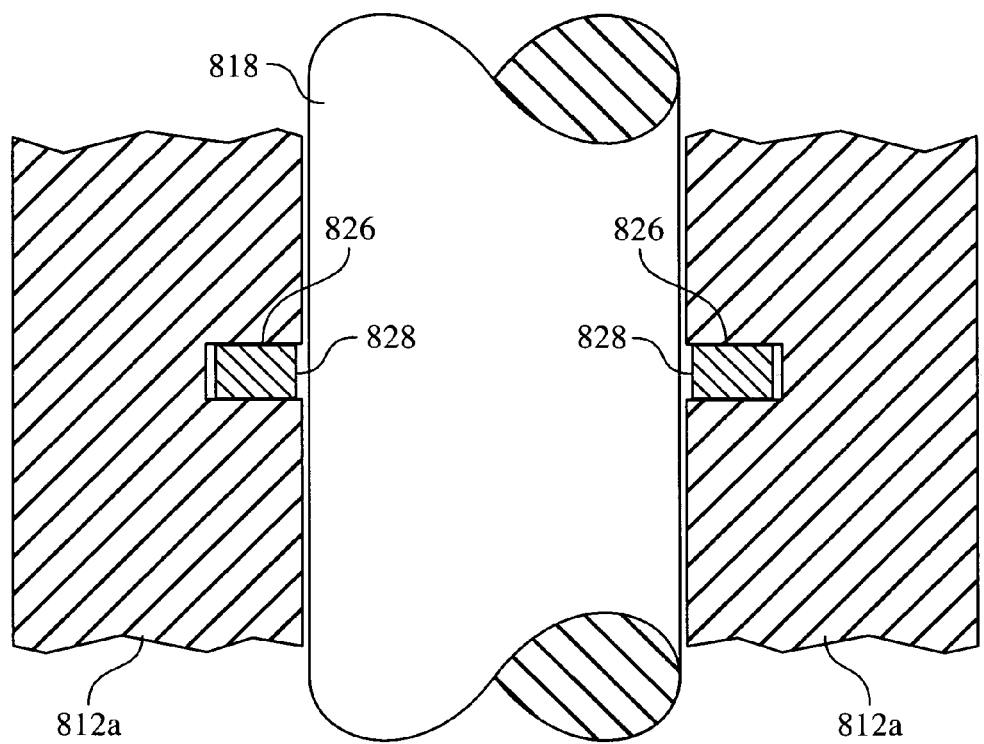
FIG. 8A illustrates schematically a cross-sectional, elevational view of a sixth deformable ring arrangement about a shaft, in an initial general condition.
Figure 8B:
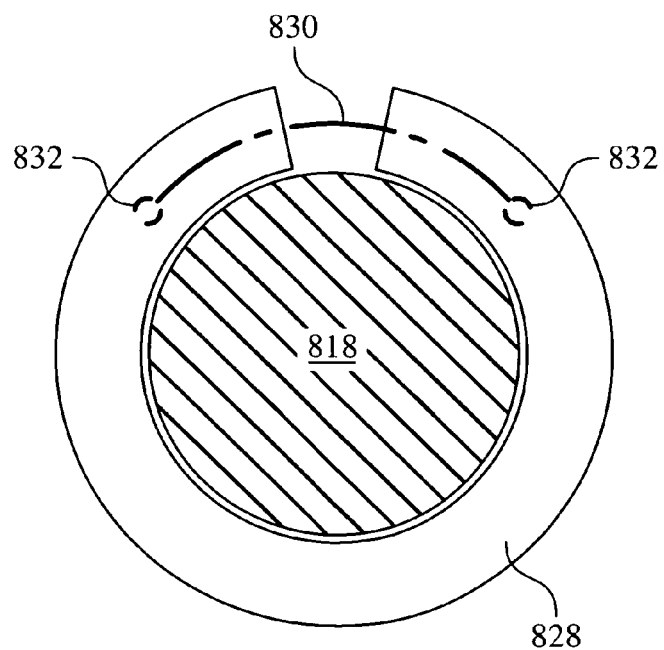
FIG. 8B illustrates the deformable ring arrangement from FIG. 8A in plan view.

FIG. 8A illustrates schematically a cross-sectional, elevational view of a sixth deformable ring arrangement about a shaft, in an initial general condition, while FIG. 8B illustrates the deformable ring arrangement from FIG. 8A in plan view. Joint reference can continue to be made to both figures.

As shown, an annular chamber 826 may be disposed about shaft 818. Preferably contained therein is a deformable ring member 828 disposed about the shaft 818. In contrast to embodiments set forth in FIGS. 3A-7D, ring member 828 here itself is essentially discontinuous or split, while actuation element 830, in a manner now to be more fully appreciated, acts by essentially pulling together the split ends of ring member 828. Generally, ring member 828 may be shaped and split similarly as the "split ring" disclosed in the '994 application. In this embodiment, the split ring member 828, in its relaxed state, maintains its ends in a separated condition, the ring member 828 generally expanded and its inner diameter larger and forming an annular clearance with the shaft 818. The split rings disclosed in the '994 application generally want to be closed and constricted when in a relaxed state and have to be held open. Generally, it can also be appreciated here that despite the ring member 828 being split, ring member 828 and actuation element 830 still present in combination at least one tangible portion which unbrokenly circumscribes or surrounds the shaft 818.

Ring member 828 preferably functions in a manner as discussed generally hereinabove, that is, it preferably deforms, in a radially inward direction with respect to a central longitudinal axis of shaft 818, in response to an actuating force. Here, actuation element 830 provides such actuation. Preferably, actuation element 830 may be formed from a shape memory material, e.g., a shape memory alloy metal, and in the form of a wire.

Thus, actuation element 830 preferably extends between two bosses, mounts or anchors 832 that themselves are disposed at an interior of ring member 828 on different sides of the split in ring member 828. Accordingly, actuation element 830 preferably extends in wire form through an interior of ring member 828 at both sides of the split and, in the initial condition of ring member 828 shown in FIGS. 8A and 8B, bridges the gap associated with the split.

Preferably, the undeformed memory shape of actuation element 830 is an unstretched configuration, while in FIGS. 8A and 8B the actuation element can be understood as being in a plastically deformed and stretched configuration. Accordingly, in the view of FIGS. 8A and 8B, in an initial condition of ring member 828, a fluid flow path sufficient for permitting a normal throughput of fluid (in a direction generally parallel to the central longitudinal axis of shaft 818) is present and element 830 is in an expanded and deformed state. In response to a temperature increase above a threshold, then, element 830 is urged to revert to its unstretched memory state, whereby through pulling action of element 830 the ring member 828 is urged to constrict about shaft 818 and thereby throttle or fully block the normal throughput of fluid.

It should be readily appreciated that actuation element 830 is preferably disposed within ring member 828 in such a way that relative movement between actuation element 830 and ring member 828 is permitted. Accordingly, the internal bore in which actuation element 830 is disposed is preferably sized such that as actuation element 830 transitions from its stretched state to its unstretched state, it can still readily be accommodated within the internal bore.

Preferably, the two ends of actuation element 830 may each terminate at bosses, mounts or anchors 832 in such a way as to be able to readily distribute and transfer pulling forces of actuation element 830 to ring member 828 itself and thereby effectively draw together the split ends of ring member 828. The bosses/mounts/anchors 832 could be integrally formed from, and be an integral portion of, the shape memory material of the actuation element 830 itself, or could be realized as attachments swaged or otherwise joined or affixed to ends of the actuation element 830.

Preferably, ring member 828 and actuation element 830 may be configured and sized such that when the split ends of ring member 828 are drawn together, causing the inner diameter portion of the ring member 828 to constrict about and contact shaft 818, a small gap between the split ends will still remain. Thence, actuation element 830 will preferably act further to close that remaining gap and thus bring the split faces of ring member 828 into contact with one another to more tightly seal about the shaft 818.

The embodiment described and illustrated with respect to FIGS. 8A-8B may also have an optional floating anti-extrusion ring and/or an optional retaining ring as shown and described with connection to the other disclosed embodiments.

Figure 9A:
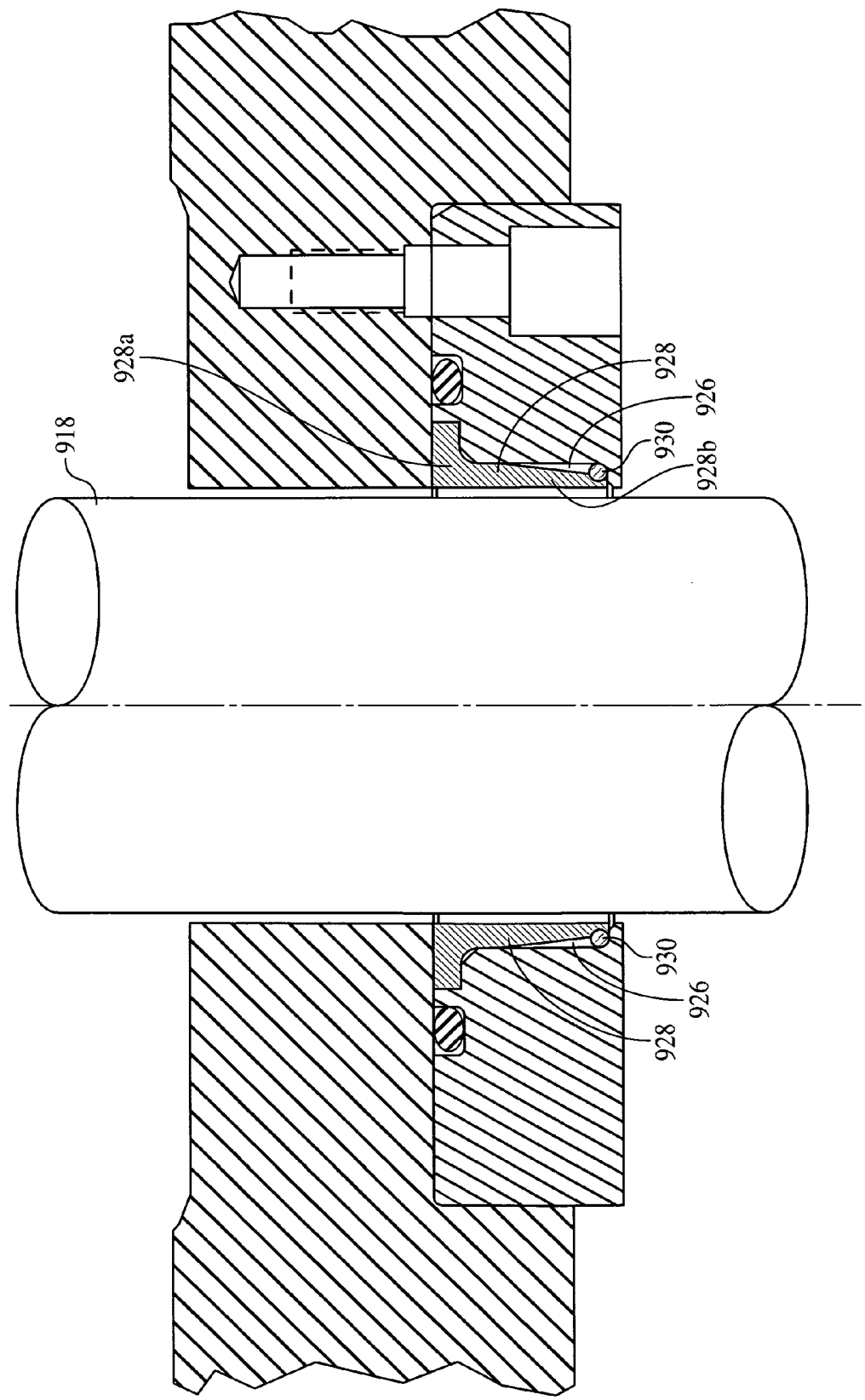
FIG. 9A illustrates schematically a cross-sectional, elevational view of a seventh deformable ring arrangement about a shaft, in an initial general condition.
Figure 9B:
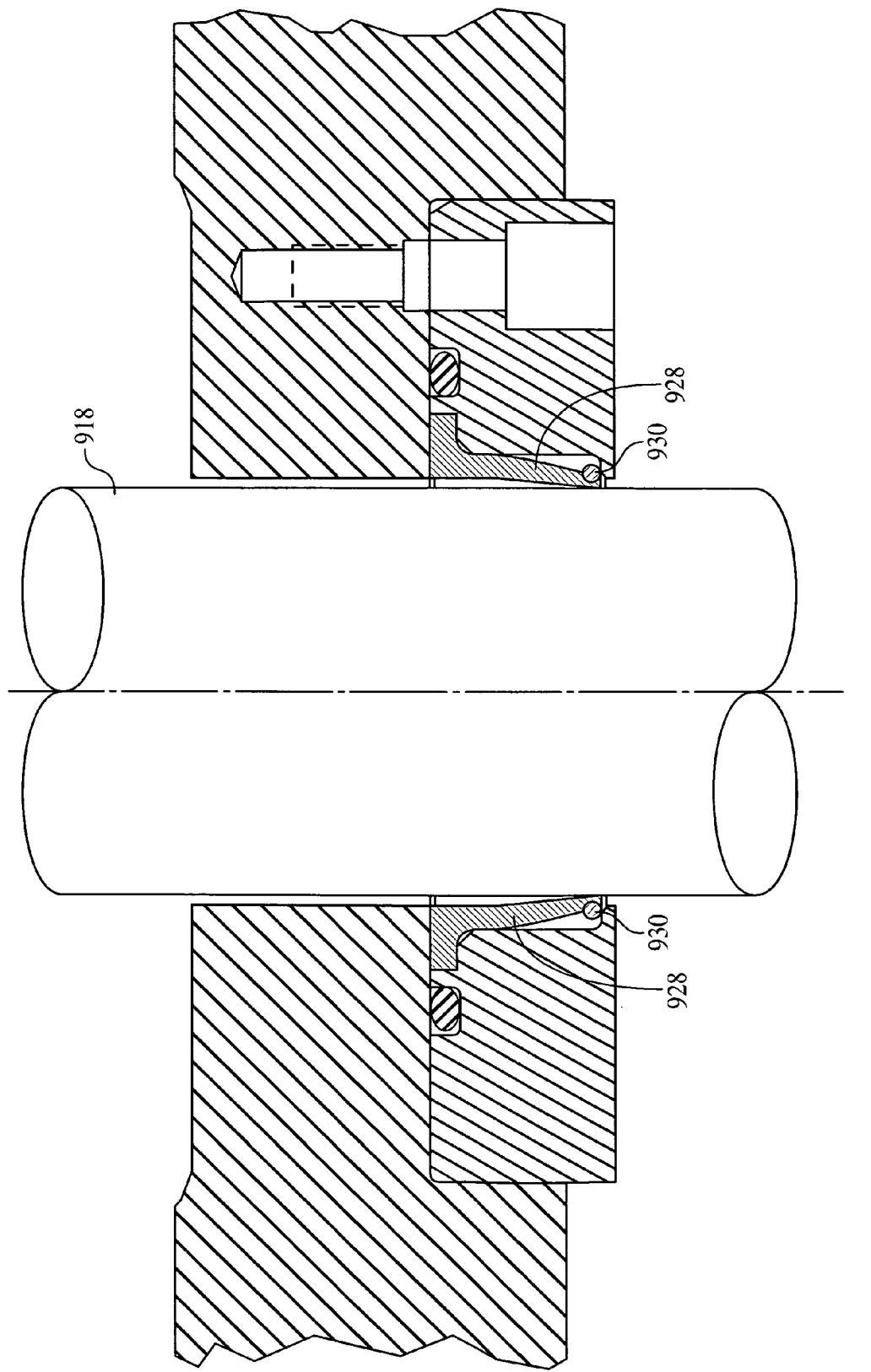
FIG. 9B is essentially the same view as FIG. 9A but showing the deformable ring arrangement actuated into an intermediate general condition.
Figure 9C:
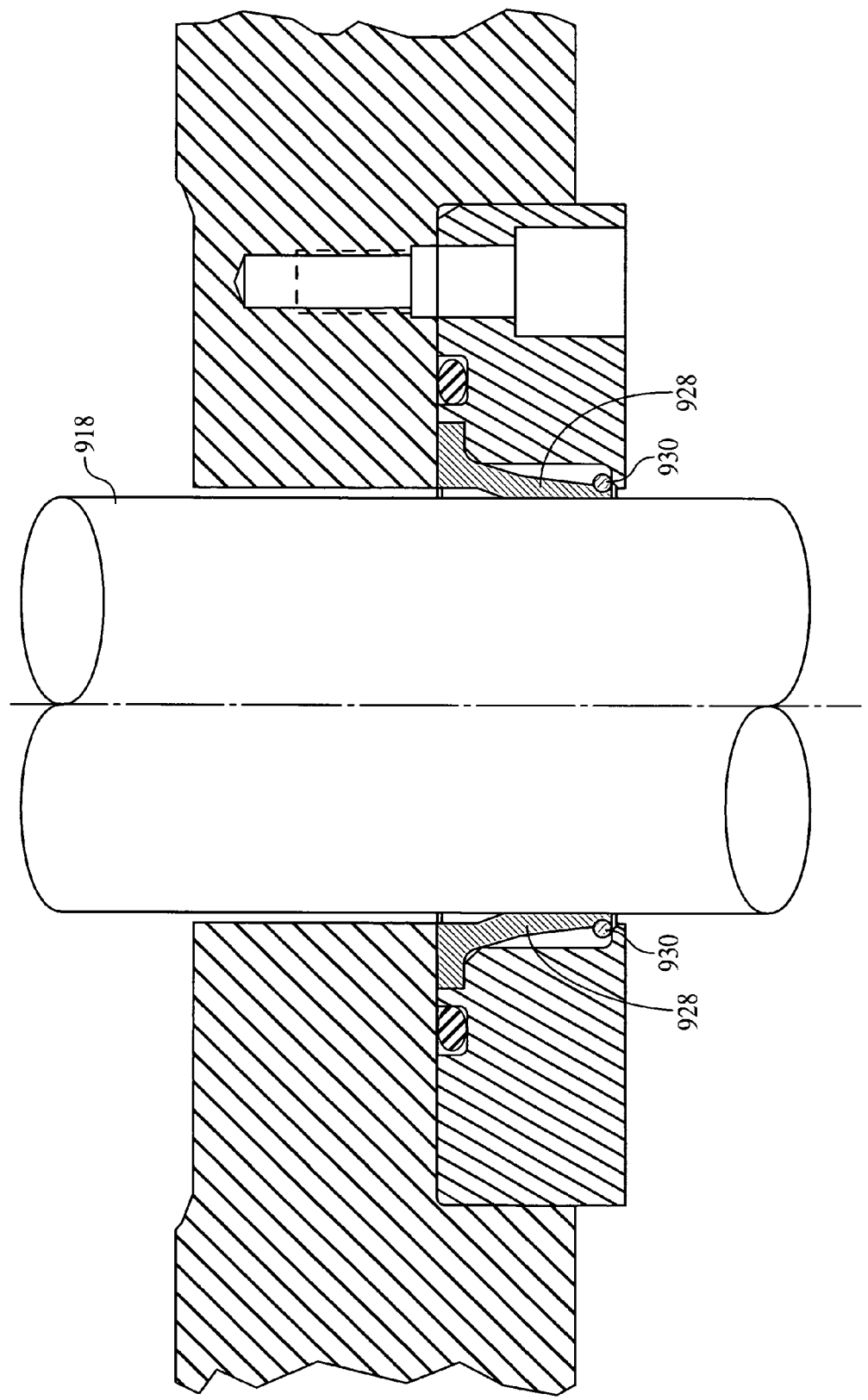
FIG. 9C is essentially the same view as FIG. 9A but showing the deformable ring arrangement actuated into a second, constricted general condition.

FIGS. 9A-9C illustrates a variant embodiment in that a continuous and deformable ring member (e.g., formed from PEEK) 928 may be formed in the shape of an elongated sleeve. Further, this elongated sleeve member 928 may differ from ring members in other embodiments discussed hereinabove, in that solely a lower (upstream) end 928B may be in a position to be constricted by an actuation element, while the upper (downstream) end 928A is firmly and sealably fixed, mounted or clamped to the housing 912a. Thus, actuation element 930, here in the form of a continuous wire shape circumscribed about shaft 918, may preferably act to constrict about solely a lower (upstream) end of sleeve member 928 responsive, e.g., to an elevated temperature as shown in FIG. 9B. In turn, this initial constriction about a lower/upstream end 928B of sleeve member 928 will promote a newly elevated pressure differential in chamber 926 (relative to the pressurization present in the annular space between sleeve member 928 and shaft 918), causing the lower (upstream) portion 928B of sleeve member 928 to collapse or constrict about shaft 918, as shown in FIG. 9C. Preferably, actuation element 930 may be formed from a shape memory material as discussed hereinabove.

Preferably, sleeve member 928 may be of a generally tapered configuration (tapering towards an upstream end thereof, as shown by way of non-restrictive example in FIG. 9A) such that after an initial seal is established at an upstream end 928B (via actuation element 930), the remainder of the sleeve member 928 progressively collapses/constricts about shaft 918 in a downstream direction until substantially the entire inner diameter of sleeve member 928 is disposed against shaft 918. Again, actuation element 930 preferably acts to create an initial seal, while further sealing is brought about by way of relative pressurization in chamber 926 that compels other portions of sleeve member 928 to collapse radially inwardly.

In accordance with all embodiments discussed hereabove, a very wide variety of additional advantageous features are conceivable. For example, a deformable ring member could be provided with suitable relief grooves and/or holes to control pressure distributions and loadings.

In accordance with the embodiments of FIGS. 3A-6H and 8A-8B, the normal flow with respect to the figures being from bottom to top along the shaft element 318, 418, 518, 618 and 818 the hydrostatic pressure forces exerted by the sealed fluid would tend to act upward on the ring member 328, 428, 528, 628 and 828, causing the upper face of the ring member 328, 428, 528, 628 and 828 to contact against the opposing surface of the annular chamber 326, 426, 526, 626 and 826, and in so doing effecting a seal between the ring member and the housing 312a, 412a, 512a, 612a and 812a. This contact and seal between the ring member and the housing element 312a, 412a, 512a, 612a and 812a along with the contact and seal between the ring member and the shaft 318, 418, 518, 618 and 818 will much limit the leakage flow. This application of upward axial hydrostatic forces should not be construed to be the only means to achieve the seal between the ring member and the housing. The contact of upper face of the ring member against the opposing surface of the annular chamber may be facilitated by springs 438, 538 and 638, or other elastic media to generate upward thrust on the ring member. This is particularly appropriate for the initial sealing as the hydrostatic forces are developing.

It should be appreciated that a very wide variety of alternate applications and environments for the salient features of the embodiments of the invention are possible. Essentially, the "deformable ring member" and "actuation element" arrangements discussed heretofore are incorporable into any workable environment in which it is desired to make a provision for limiting fluid flow through an annulus between two circular members, the inner member being a circular shaft which is normally rotating or reciprocating relative to the second member, and the second member being a housing which surrounds the inner circular shaft member. (In actuality, depending on the application, normal motion need only be relative between the two members and either one may move in the absolute sense.)

Without further analysis, the foregoing will so fully reveal the gist of the invention and its embodiments that others can, by applying current knowledge, readily adapt it for various applications without omitting features that, from the standpoint of prior art, fairly constitute characteristics of the generic or specific aspects of the invention and its embodiments.

If not otherwise stated herein, it may be assumed that all components and/or processes described heretofore may, if appropriate, be considered to be interchangeable with similar components and/or processes disclosed elsewhere in the specification, unless an express indication is made to the contrary.

If not otherwise stated herein, any and all patents, patent publications, articles and other printed publications discussed or mentioned herein are hereby incorporated by reference as if set forth in their entirety herein.

It should be appreciated that the apparatus and method of the invention may be configured and conducted as appropriate for any context at hand. The embodiments described above are to be considered in all respects only as illustrative and not restrictive. All changes which come within the meaning and range of equivalency of the claims are to be embraced within their scope.

What is claimed is:

1. In a structure comprising a shaft member and a support structure through which the shaft member extends, an arrangement for restricting fluid flow along the shaft member relative to the support structure in at least one annular space defined between the shaft member and the support structure, said arrangement for restricting fluid flow comprising:

a continuous ring member disposed about the shaft member, wherein said continuous ring member unbrokenly circumscribes the shaft member;

said continuous ring member being deformable in at least a radial direction towards and away from the shaft member, with respect to a central longitudinal axis of the shaft member;

an actuation medium for deforming said continuous ring member in the radial direction;

said actuation medium acting to deform said continuous ring member between a first general condition and a second general condition, wherein said actuation medium comprises a discontinuous ring element which is discontinuous with respect to a circumferential dimension of said discontinuous ring element, wherein said discontinuous ring element is disposed upstream of said continuous ring member;

wherein, in said first general condition, a greater flow path for fluid is afforded, in the at least one annular space defined between the shaft member and the support structure, than in said second general condition, wherein in said second condition said continuous ring member constricts about the shaft member;

wherein the discontinuous ring element has two ends, and wherein in a first position, the ends are spaced apart, and wherein in a second position the ends are closer together;

wherein said discontinuous ring element effects an initial seal, the initial seal restricting fluid flow along the shaft member relative to the support structure at a location upstream from said continuous ring member;

wherein said discontinuous ring element actuates the deforming of the continuous ring member by promoting a pressure differential subsequent to effect an initial seal, the pressure differential acting to deform said continuous ring member between said first condition and said second condition;

wherein the fluid flow restricting arrangement further comprises a spacer element adapted to hold the ends of the discontinuous ring element apart in the first position and to permit the ends of the discontinuous ring element to close in the second position.

2. The fluid flow restricting arrangement according to claim 1, wherein said continuous ring member comprises a material with a lower modulus of elasticity than moduli of elasticity of the support structure and the shaft member.

3. The fluid flow restricting arrangement according to claim 2, wherein said material with a lower modulus of elasticity comprises a polymeric material.

4. The fluid flow restricting arrangement according to claim 3, wherein said polymeric material comprises PEEK.

5. The fluid flow restricting arrangement according to claim 1, further comprising:
an annular chamber which houses said continuous ring member; and
a retaining member forming at least a portion of a wall of the annular chamber.

6. The fluid flow restricting arrangement according to claim 1, further comprising:
an elastic member for providing downstream axial forces on said continuous ring member.

7. The fluid flow restricting arrangement according to claim 6,
wherein said elastic member is at least one spring.

8. The fluid flow restricting arrangement according to claim 1, wherein the spacer element is disposed between the ends of the discontinuous ring element in the first position and not disposed between the ends of the discontinuous ring element in the second position.

9. The fluid flow restricting arrangement according to claim 8, wherein the spacer element is a mechanical retractable plunger, and wherein retraction of the plunger permits the ends of the discontinuous ring element to close in the second position.

10. The fluid flow restricting arrangement according to claim 8, wherein the spacer element comprises a meltable or dissolvable material, and wherein melting or dissolving of the material permits the ends of the discontinuous ring element to close in the second position.

11. A rotary pump comprising:
a motor;
a shaft member extending from said motor;
an impeller attached to a free end of said shaft member;
a housing which encloses a major portion of said shaft member;
said housing comprising a seal housing which circumscribes at least a portion of said shaft member, said seal housing including at least one sealing element for restricting fluid flow along said shaft member;
said motor being configured for rotating said shaft member in a manner to drive said impeller; and
an arrangement for restricting fluid flow along the shaft member relative to the seal housing in at least one annular space defined between said shaft member and said seal housing;
said fluid flow restricting arrangement comprising a continuous ring member disposed about the shaft member, wherein said continuous ring member unbrokenly circumscribes the shaft member;
said continuous ring member being deformable in at least a radial direction towards and away from the shaft member, with respect to a central longitudinal axis of the shaft member;
an actuation medium for deforming said continuous ring member in the radial direction;
said actuation medium acting to deform said continuous ring member between a first condition and a second condition, wherein said actuation medium comprises a discontinuous ring element which is discontinuous with respect to a circumferential dimension of said discontinuous ring element, wherein said discontinuous ring element is disposed upstream of said continuous ring member;
wherein, in said first condition, a greater flow path for fluid is afforded, in the at least one annular space defined between the shaft member and the seal housing, than in said second condition, wherein in said second condition said continuous ring member constricts about the shaft member;
wherein the discontinuous ring element has two ends, and wherein in a first position, the ends are spaced apart, and wherein in a second position the ends are closer together;
wherein said discontinuous ring element effects an initial seal, the initial seal restricting fluid flow along the shaft member relative to the housing at a location upstream from said continuous ring member;
wherein said discontinuous ring element actuates the deforming of the continuous ring member by promoting a pressure differential subsequent to effect an initial seal, the pressure differential acting to deform said continuous ring member between said first condition and said second condition
wherein the fluid flow restricting arrangement further comprises a spacer element adapted to hold the ends of the discontinuous ring element apart in the first position and to permit the ends of the discontinuous ring element to close in the second position.

12. The rotary pump according to claim 11, wherein said continuous ring member comprises a material with a lower modulus of elasticity than moduli of elasticity of the housing and the shaft member.

13. The rotary pump according to claim 11, wherein said rotary pump comprises a chemical processing pump.

14. The rotary pump according to claim 11, wherein said rotary pump comprises a reactor coolant pump.

15. In a structure comprising a shaft member and a support structure through which the shaft member extends, an arrangement for restricting fluid flow along the shaft member relative to the support structure in at least one annular space defined between the shaft member and the support structure, said arrangement for restricting fluid flow comprising:
a continuous ring member disposed about the shaft member, wherein said continuous ring member unbrokenly circumscribes the shaft member;
said continuous ring member being deformable in at least a radial direction towards and away from the shaft member, with respect to a central longitudinal axis of the shaft member;
an actuation medium for deforming said continuous ring member;
said actuation medium acting to deform said continuous ring member between a first condition and a second condition;
an anti-extrusion member recessed into a downstream face at an inner diameter portion of the continuous ring member for preventing any material from the continuous ring member from extruding in a downstream direction;
wherein, in said first condition, a greater flow path for fluid is afforded, in the at least one annular space defined between the shaft member and the support structure, than in said second condition.

* * * * *